(12) United States Patent  (10) Patent No.: US 9,342,190 B2
Lu et al.  (45) Date of Patent: May 17, 2016

(54) OPTICAL TOUCH APPARATUS AND OPTICAL TOUCH METHOD FOR MULTI-TOUCH

(71) Applicant: Wistron Corporation, New Taipei (TW)

(72) Inventors: Kuo-Hsien Lu, New Taipei (TW); Yu-Yen Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 14/483,176

(22) Filed: Sep. 11, 2014

(65) Prior Publication Data
US 2015/0253933 A1 Sep. 10, 2015

(30) Foreign Application Priority Data

Mar. 5, 2014 (TW) .............................. 103107461 A

(51) Int. Cl.
G06F 3/042 (2006.01)
G06F 3/041 (2006.01)

(52) U.S. Cl.
CPC ............ *G06F 3/0428* (2013.01); *G06F 3/0416* (2013.01); *G06F 3/042* (2013.01)

(58) Field of Classification Search
CPC ...... G06F 3/042; G06F 3/0428; G06F 3/0416
USPC ........................................ 345/175; 178/18.09
See application file for complete search history.

(56) References Cited

U.S. PATENT DOCUMENTS 8,692,803 B2  4/2014  Yen et al.

2010/0321309 A1* 12/2010 Lee .................. G06F 3/0421
345/173
2013/0278563 A1  10/2013  Chang et al.
2013/0314378 A1  11/2013  Chang et al.

FOREIGN PATENT DOCUMENTS

TW  1399678  6/2013
TW  201344532  11/2013
TW  201349055  12/2013

OTHER PUBLICATIONS

"Office Action of Taiwan Counterpart Application", issued on Nov. 24, 2015, with English translation thereof, p. 1-p. 6, in which the listed references were cited.

* cited by examiner

*Primary Examiner* — Adam J Snyder
(74) *Attorney, Agent, or Firm* — Jianq Chyun IP Office

(57) ABSTRACT

An optical touch apparatus including a light source module, two optical sensing modules and a processing unit is provided. The light source module provides a touch light source for a touch area. The optical sensing modules are disposed corresponding to two corners of the touch area. The processing unit is coupled to the light source module and the optical sensing modules, and controls the light source module to provide the touch light source in a first touch mode and a second touch mode and stop providing the touch light source in a third touch mode. Each of the optical sensing modules continuously senses and outputs a plurality of sensing signals. The processing unit determines a plurality of touching features of the sensing signals respectively to calculate positions of a plurality of touching objects on the touch area. An optical touch method is also provided.

22 Claims, 24 Drawing Sheets

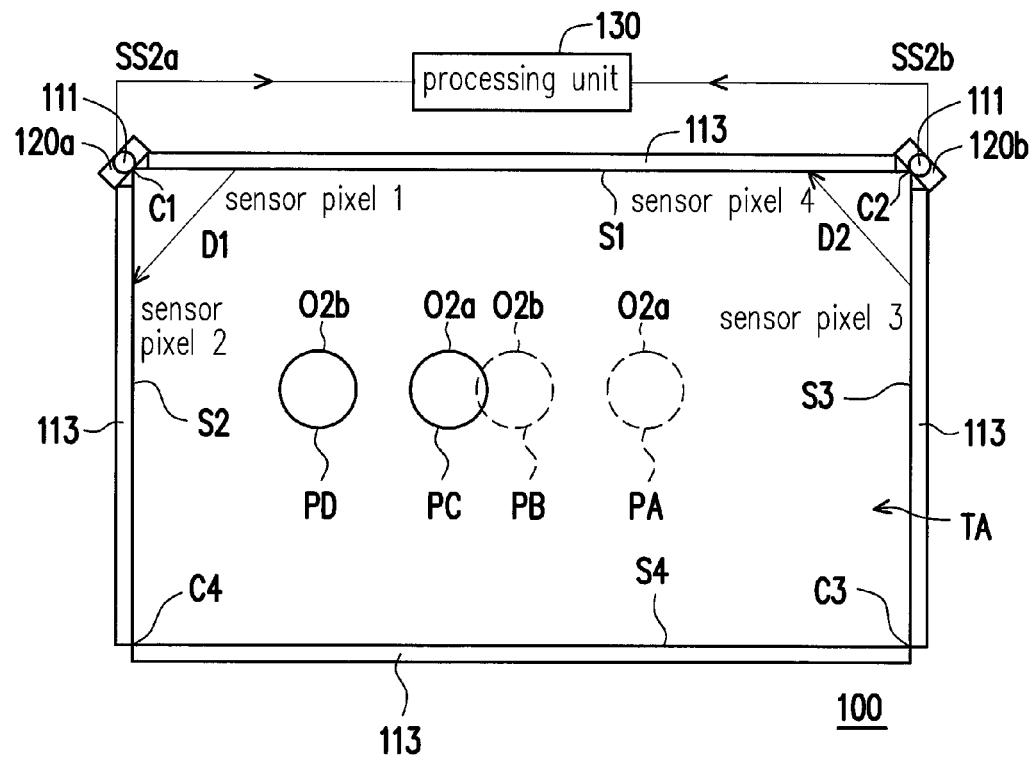
FIG. 6A
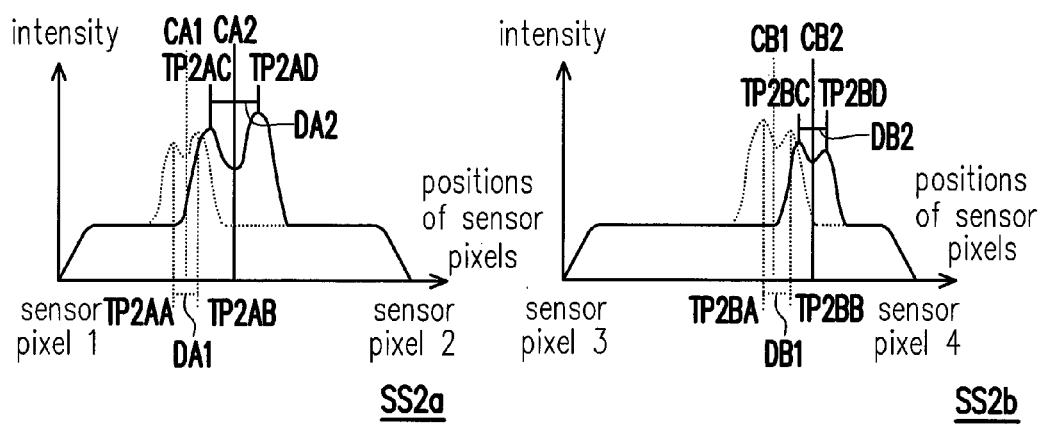
FIG. 6B
FIG. 6C

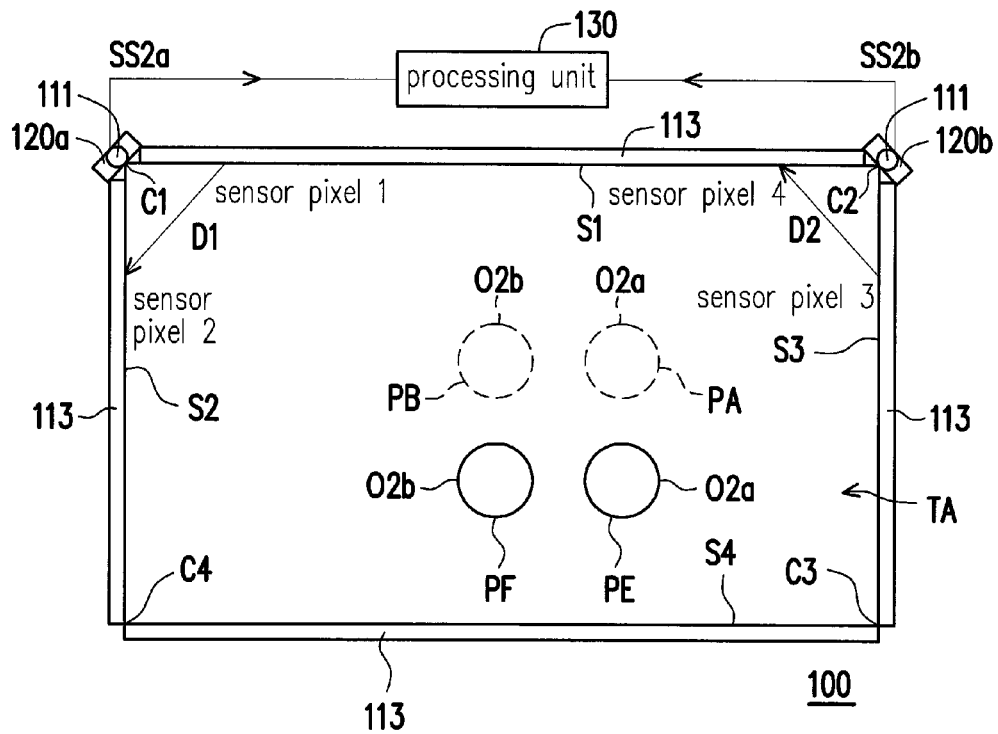
FIG. 6D
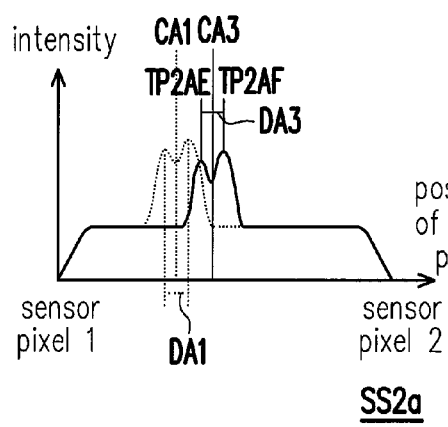
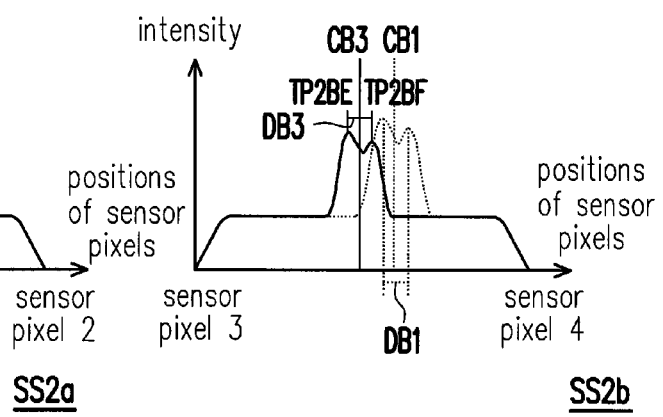
FIG. 6E      FIG. 6F

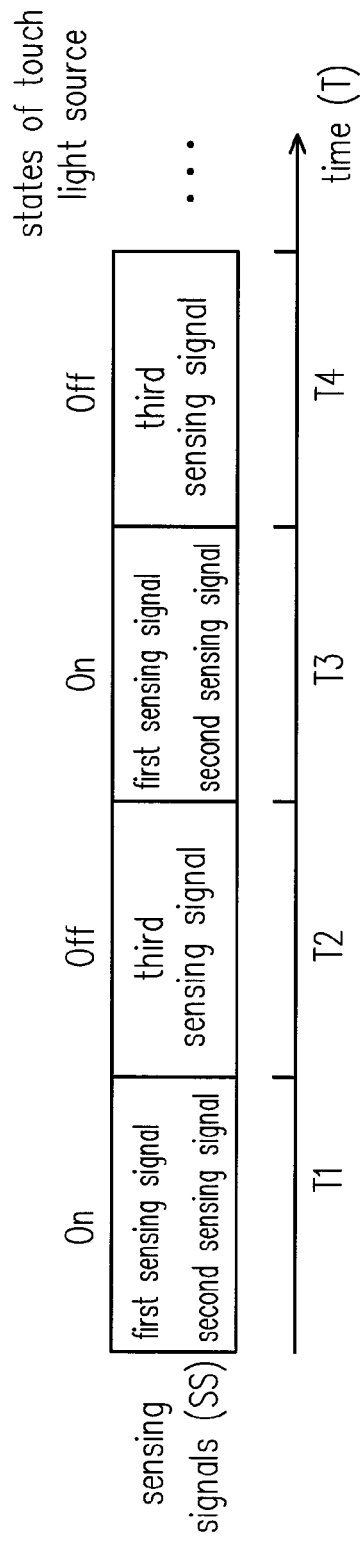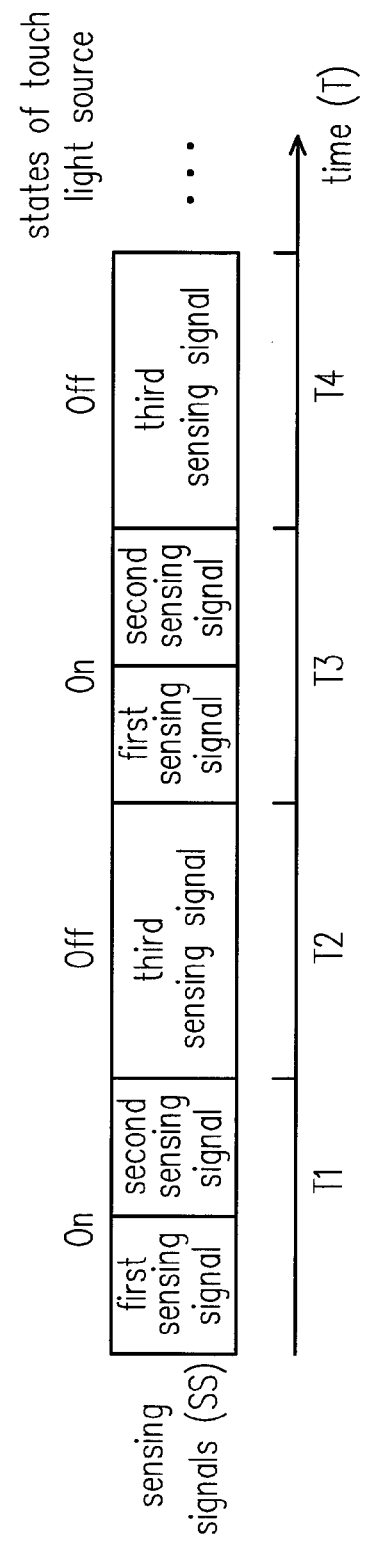

OPTICAL TOUCH APPARATUS AND OPTICAL TOUCH METHOD FOR MULTI-TOUCH

CROSS-REFERENCE TO RELATED APPLICATION

This application claims the priority benefit of Taiwan application serial no. 103107461, filed on Mar. 5, 2014. The entirety of the above-mentioned patent application is hereby incorporated by reference herein and made a part of this specification.

BACKGROUND OF THE DISCLOSURE

1. Field of the Disclosure

The disclosure relates to a touch apparatus and a touch method, and more particularly, relates to an optical touch apparatus and an optical touch method.

2. Description of Related Art

Recently, touch electronic products have become very popular among consumers due to the easy operation and high intuition thereof, and have gradually become mainstream in the market. Among the resistive, capacitive, and rear projection touch screens used in the past, the capacitive touch screen has the best touch effect. However, the capacitive touch screen is also the most expensive, and the cost thereof increases with larger screen size, thereby limiting the application of the capacitive touch screen. To find an alternative to the capacitive touch screen, an optical touch technology using an optical sensing module to detect a touch position is currently available. The optical touch technology has the advantages of low cost and good accuracy, and is more advantageous in the competitive market. As a result, the optical touch technology has currently also become an alternative for a large-size touch screen.

Generally speaking, in the optical touch technology, a light source module and the optical sensing module are disposed on edges of the screen, and the touch light source is guided to a touch area through a light guide member of the light source module. A determination is made according a touching feature generated by the optical sensing module according to a part of light from the touch light source being reflected or blocked by a touching object, such that a position where the touching object is located may then be calculated.

However, when a quantity of the touching objects is greater than two, it is more complex for a processing unit to identify and calculate the touch positions. Further, misjudgments or interrupts may also be generated due to conditions such as a "ghost points" issue, which also needs to be solved. For instance, when two touching objects touch the touch area at the same time, as an effect of cross-capturing images by the optical sensing module, four intersection points including two touch points and two ghost points are generated. At the time, the processing unit may calculate coordinates of the two touch points and coordinates of the two ghost points; confirm that the two touch points are the real touch points after identifying based on determination and selection regarding specific features and conditions; and then only output the coordinates of the two points being confirmed. A quantity of the ghost points gets more when the quantity of the touching objects is more. For instance, in case the quantity of the touching object is three, as the effect of cross-capturing images by the optical sensing module, nine intersection points are generated, in which the quantity of the ghost points is six. In other words, as the quantity of the touching objects gets more, the determination for the ghost points is more complex, so that amount of calculations is also increased.

In addition, in order to achieve a purpose of multi-touch, a solution is to increase a of sensors on different positions of the touch area as to facilitate in determining the ghost points and filtering the ghost points to determine the real touch points. Nevertheless, product cost may be increased accordingly, and a lot of time is still wasted because the amount of the calculations is overly high.

SUMMARY OF THE DISCLOSURE

The disclosure is directed to an optical touch apparatus for achieving multi-touch while reducing the product cost and saving the calculation time.

The disclosure is also directed to an optical touch method for achieving multi-touch while reducing the product cost and saving the calculation time.

The optical touch apparatus of the disclosure includes a light source module, two optical sensing modules and a processing unit. The light source module provides a touch light source for a touch area. The optical sensing modules are disposed corresponding to two corners of the touch area. The processing unit is coupled to the light source module and the optical sensing modules. The processing unit controls the light source module to provide the touch light source in a first touch mode and a second touch mode, and controls the light source module to stop providing the touch light source in a third touch mode. Each of the optical sensing modules continuously senses and outputs a plurality of sensing signals in the first touch mode, the second touch mode and the third touch mode, and the processing unit determines a plurality of touching features of the sensing signals respectively according to the first touch mode, the second touch mode and the third touch mode to calculate positions of a plurality of touching objects on the touch area.

The optical touch method of the disclosure includes the following steps: controlling a light source module to provide a touch light source for a touch area in a first touch mode and a second touch mode; controlling the light source module to stop providing the touch light source in a third touch mode; making two optical sensing modules to continuously sense and output a plurality of sensing signals in the first touch mode, the second touch mode and the third touch mode, wherein the optical sensing modules are disposed corresponding to two corners of the touch area; and determining a plurality of touching features of the sensing signals respectively according to the first touch mode, the second touch mode and the third touch mode to calculate positions of a plurality of touching objects on the touch area.

In an embodiment of the disclosure, the first touch mode, the second touch mode and the third touch mode are occurred at different time frames.

In an embodiment of the disclosure, the touching objects include a plurality selected from the group consisting of two first touching objects, two second touching objects and two third touching objects. The first touching objects are adapted to block the touch light source; the second touching objects are adapted to reflect the touch light source; and the third touching objects are adapted to generate a sensing light beam.

In an embodiment of the disclosure, the touch light source and the sensing light beam are emitted at different time frames.

In an embodiment of the disclosure, the touching features include a first touching feature, and the processing unit determines a declining portion in response to the touch light source being blocked in the sensing signals received in the first touch mode as the first touching feature.

In an embodiment of the disclosure, the touching features include a second touching feature, and the processing unit determines a protruding portion in response to the touch light source being reflected in the sensing signals received in the second touch mode as the second touching feature.

In an embodiment of the disclosure, the touching features include a third touching feature, and the processing unit determines a protruding portion in response to a sensing light beam of the sensing signals received in the third touch mode as the third touching feature.

In an embodiment of the disclosure, the sensing signals include a first sensing signal, a second sensing signal and a third sensing signal, and each of the optical sensing modules continuously senses and outputs the first sensing signal, the second sensing signal and the third sensing signal respectively in the first touch mode, the second touch mode and the third touch mode.

In an embodiment of the disclosure, the sensing signals include a first sensing signal and a second sensing signal, and each of the optical sensing modules continuously senses and outputs the first sensing signal and the second sensing signal respectively when the touch light source is provided and when the touch light source is not provided.

In an embodiment of the disclosure, the processing unit determines the first sensing signal according to both the first touch mode and the second touch mode.

In an embodiment of the disclosure, a quantity of the touching objects is greater than or equal to 1 and less than or equal to 6.

In an embodiment of the present disclosure, the light source module includes at least one light-emitting element and a light guide member. The at least one light-emitting element is adapted to provide a touch light source. The light guide member is adapted to guide the touch light source into the touch area.

In an embodiment of the disclosure, the touching features include a first touching feature, and a method of determining the first touching feature includes: the processing unit determines a declining portion in response to the touch light source being blocked in the sensing signals received in the first touch mode as the first touching feature.

In an embodiment of the disclosure, the touching features include a second touching feature, and a method of determining the second touching feature includes: the processing unit determines a protruding portion in response to the touch light source being reflected in the sensing signals received in the second touch mode as the second touching feature.

In an embodiment of the disclosure, the touching features include a third touching feature, and a method of determining the third touching feature includes: the processing unit determines a protruding portion in response to a sensing light beam of the sensing signals received in the third touch mode as the third touching feature.

In an embodiment of the disclosure, the sensing signals include a first sensing signal, a second sensing signal and a third sensing signal, and a method of outputting the sensing signals includes: each of the optical sensing modules continuously senses and outputs the first sensing signal, the second sensing signal and the third sensing signal respectively in the first touch mode, the second touch mode and the third touch mode.

In an embodiment of the disclosure, the sensing signals include a first sensing signal and the method of outputting the sensing signals includes: a second sensing signal, and each of the optical sensing modules continuously senses and outputs the first sensing signal and the second sensing signal respectively when the touch light source is provided and when the touch light source is not provided.

In an embodiment of the disclosure, the optical touch method further includes determining the first sensing signal according to both the first touch mode and the second touch mode.

Based on above, in the optical touch apparatus and the optical touch method according to the disclosure, by controlling the light source module to provide the touch light source or not in the different touch modes, and controlling the optical sensing modules to continuously sense and output the sensing signals in the different touch modes, the different touching objects may be sensed at the different time frames. In addition, the optical touch apparatus and the optical touch method are capable of determining the touching features of the sensing signals, respectively, so as to calculate the positions of the touching objects on the touch area. Accordingly, the optical touch apparatus is capable of significantly reducing occurrences of the ghost points for lowering the possibility of misjudgments. As a result, functions of the multi-touch may be realized without increasing the of the optical sensing modules, thereby reducing the product cost and saving the calculation time.

To make the above features and advantages of the disclosure more comprehensible, several embodiments accompanied with drawings are described in detail as follows.

BRIEF DESCRIPTION OF THE DRAWINGS

FIG. 6A is a schematic diagram illustrating movements of the second touching objects on the touch area.

FIG. 6B and FIG. 6C are schematic diagrams respectively illustrating the second sensing signals sensed by the two optical sensing modules of FIG. 6A.

FIG. 6D is a schematic diagram illustrating movements of the second touching objects on the touch area.

FIG. 6E and FIG. 6F are schematic diagrams respectively illustrating the second sensing signals sensed by the two optical sensing modules of FIG. 6D.

FIG. 7E is a timing mode diagram of the processing unit of FIG. 7A in receiving different sensing signals with respect to on/off state of the touch light source.

FIG. 7F is another timing mode diagram of the processing unit of FIG. 7A in receiving different sensing signals with respect to on/off state of the touch light source.

DESCRIPTION OF THE EMBODIMENTS

Figure 1:
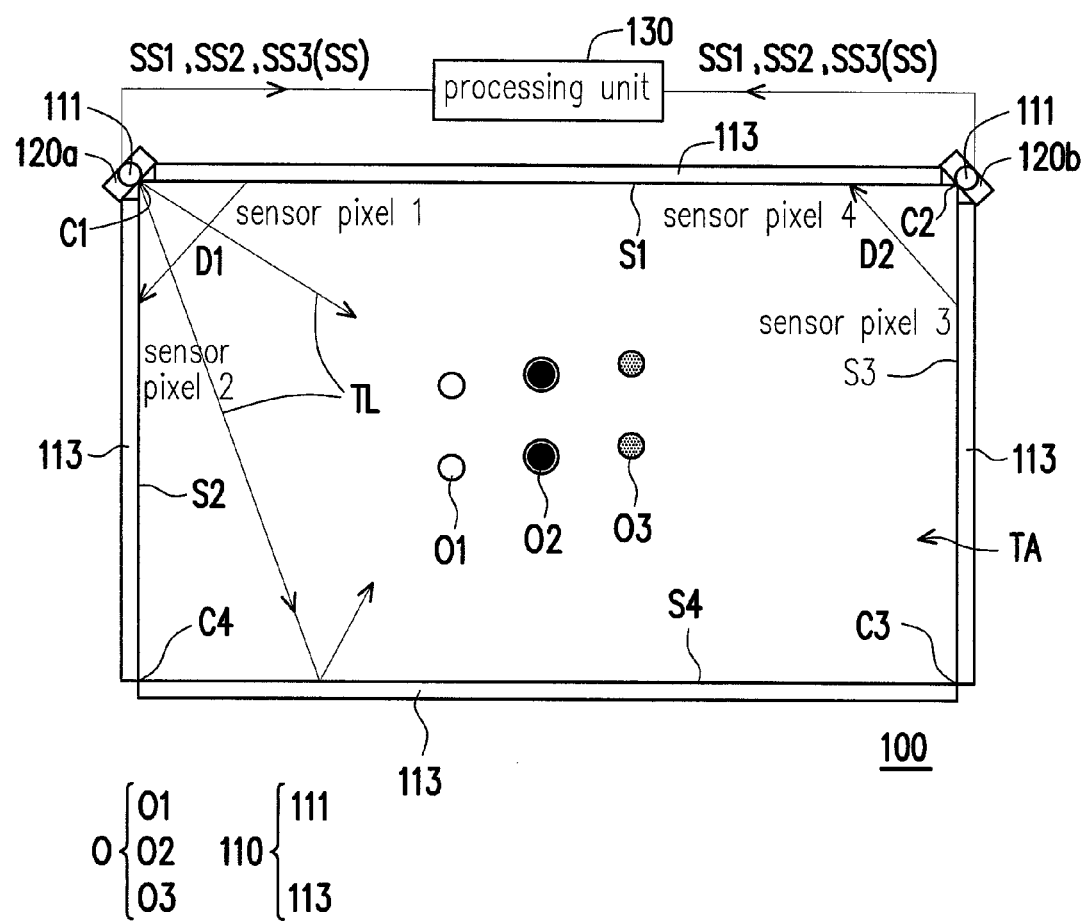
FIG. 1 is a schematic structure diagram of an optical touch apparatus according to an embodiment of the disclosure.

FIG. 1 is a schematic structure diagram of an optical touch apparatus according to an embodiment of the disclosure. Referring to FIG. 1, an optical touch apparatus 100 of the present embodiment includes a light source module 110, two optical sensing modules 120a and 120b and a processing unit 130. The processing unit 130 is coupled to the light source module 110 and the optical sensing modules 120a and 120b. For instance, in the present embodiment, the optical sensing modules 120a and 120b may be, for example, a charge coupled device (CCD) or a complementary metal-oxide semiconductor (CMOS) image sensing element, but the disclosure is not limited thereto. In addition, the processing unit 130 may be a functional module implemented by hardware and/or software, in which the hardware can be a hardware apparatus with data calculation processing capability such as a CPU, a chip set, a microprocessor, or a combination of the above, and the software can be an operating system or a driver and so on. However, the disclosure is not limited thereto either.

More specifically, in the present embodiment, the light source module 110 includes at least one light-emitting element 111 and a light guide member 113. The at least one light-emitting element 111 is adapted to provide a touch light source TL. For example, the light-emitting element 111 may be a light-emitting diode. The light guide member 113 is adapted to guide the touch light source TL into a touch area TA. Furthermore, referring to FIG. 1, the touch light source TL may travel through the touch area when the touch light source TL is provided by the light-emitting element 111 of the light source module 110, and the touch light source TL may then be reflected by the light guide member 113. In other words, in the present embodiment, the light source module 110 may provide the touch light source TL for the touch area TA. On the other hand, in the present embodiment, the optical sensing modules 120a and 120b are disposed corresponding to two corners of the touch area TA. For instance, in the present embodiment, the optical sensing modules 120a and 120b are disposed at two opposite corners C1 and C2 on the same side of the touch area TA, respectively, so as to continuously sense and output a plurality of sensing signals SS. Functions regarding each of elements and modules of the optical touch apparatus 100 according to the present embodiment are further described below with reference to FIG. 2 to FIG. 7.

Figure 2:
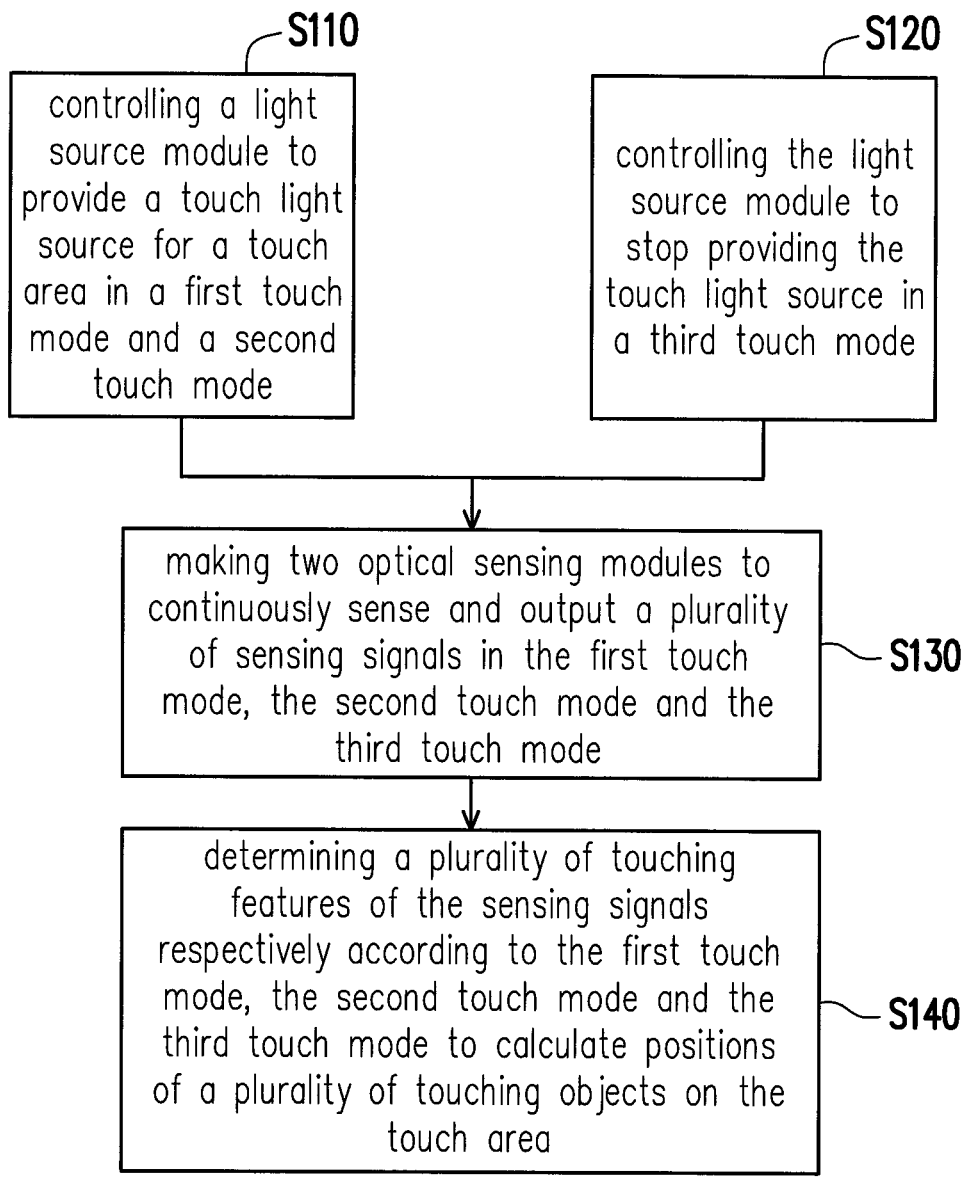
FIG. 2 is a flowchart of an optical touch method according to an embodiment of the disclosure.

FIG. 2 is a flowchart of an optical touch method according to an embodiment of the disclosure. Referring to FIG. 2, in the present embodiment, the optical touch method may be executed by utilizing the optical touch apparatus 100 of FIG. 1 for example. Detailed steps of the optical touch method of the present embodiment are further described below with reference to each of the elements in the optical touch apparatus 100.

First, in steps S110 and S120, the processing unit 130 controls the light source module 110 to provide the touch light source TL for the touch area TA in a first touch mode and a second touch mode, and controls the light source module 110 to stop providing the touch light source TL in a third touch mode. Next, in step S130, each of the optical sensing modules 120a and 120b continuously senses and outputs a plurality of sensing signals SS in the first touch mode, the second touch mode and the third touch mode. Thereafter, in step S140, the processing unit 130 determines a plurality of touching features of the sensing signals SS respectively according to the first touch mode, the second touch mode and the third touch mode to calculate positions of a plurality of touching objects O on the touch area TA.

For instance, as shown in FIG. 1, in the present embodiment, the touching objects O on the touch area TA includes a plurality selected from the group consisting of two first touching objects O1, two second touching objects O2 and two third touching objects O3. In other words, in the present embodiment, a quantity of the touching objects O may be greater than or equal to 1 and less than or equal to 6. More specifically, in the present embodiment, the first touch mode, the second touch mode and the third touch mode are occurred at different time frames. Furthermore, in the present embodiment, the sensing signals SS include sensing signals SS1, SS2 and SS3. Each of the optical sensing modules 120a and 120b may continuously sense and output the sensing signals SS1, SS2 and SS3 respectively in the first touch mode, the second touch mode and the third touch mode, so as to sense for different objects O at the different time frames. That is, the optical touch apparatus 100 of the present embodiment is adapted to perform a multi-touch. Differences between the first touching object O1, the second touching object O2 and the third touching object O3 as well as a method of how the processing unit 130 controls on/off state of the touch light source TL are further described with reference to FIG. 3A to FIG. 3H.

Figure 3A:
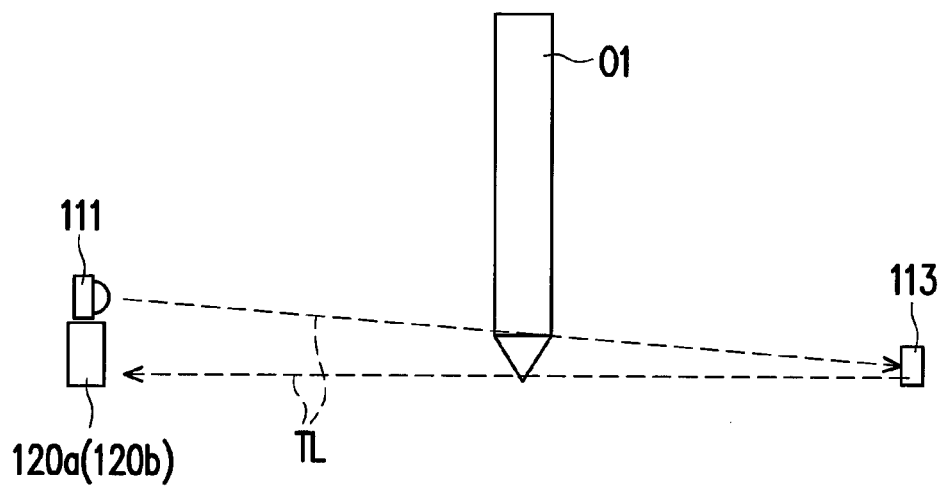
FIG. 3A is a schematic diagram of the touching object touching the optical touch apparatus of FIG. 1 in the first touch mode.
Figure 3B:
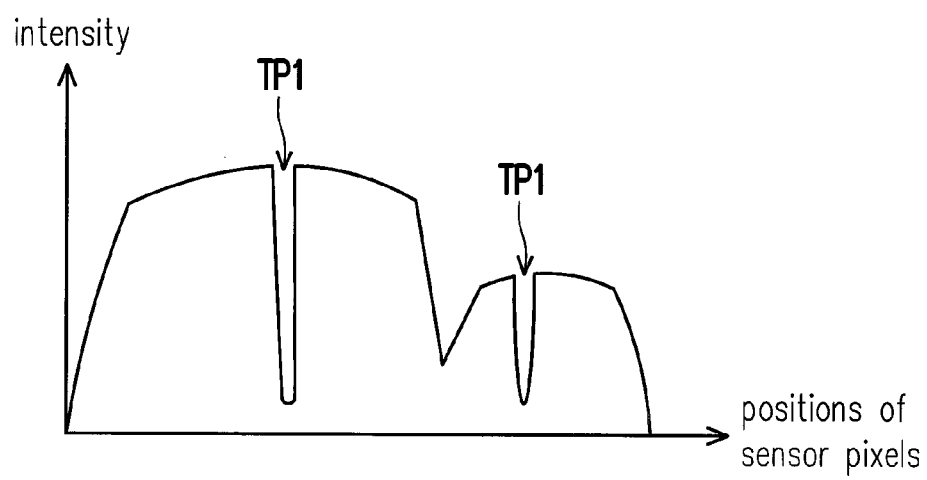
FIG. 3B is a schematic diagram of the first touching feature of FIG. 3A.

FIG. 3A is a schematic diagram of the first touching object touching the optical touch apparatus of FIG. 1 in the first touch mode. FIG. 3B is a schematic diagram of the first touching feature of FIG. 3A. Referring to FIG. 3A and FIG. 3B, in the present embodiment, the first touching object O1 is adapted to block the touch light source TL to block a part of light beam from the touch light source TL, so that the touching features of the touch signals SS1 sensed and outputted by the optical sensing modules 120a and 120b in the first touch mode include a first touching feature TP1. Furthermore, as shown in FIG. 3B, in the present embodiment, a method of determining the first touching feature TP1 includes: the processing unit 130 determines a declining portion in response to the touch light source TL being blocked in the sensing signals SS1 received in the first touch mode as the first touching feature TP1.

Figure 3C:
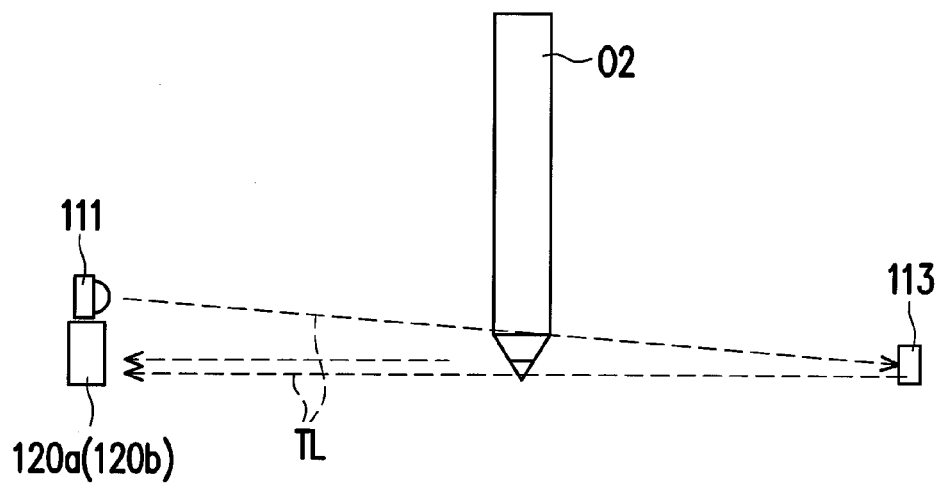
FIG. 3C is a schematic diagram of the touching object touching the optical touch apparatus of FIG. 1 in the second touch mode.
Figure 3D:
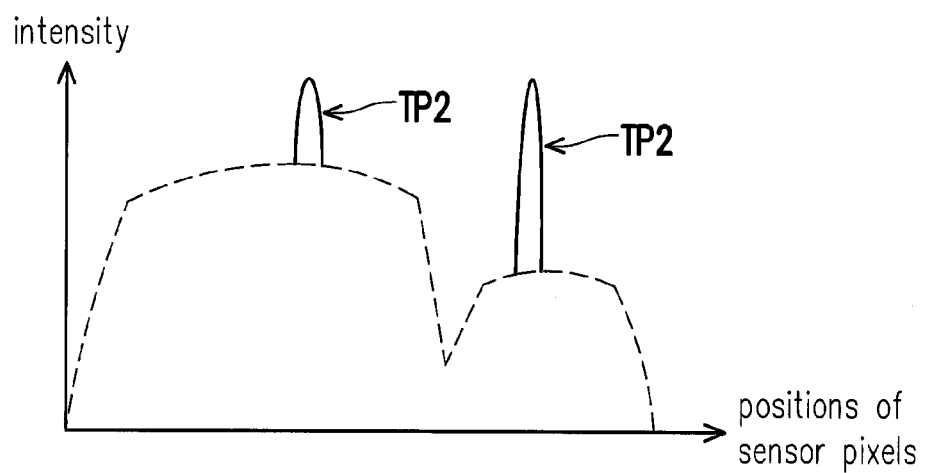
FIG. 3D is a schematic diagram of the second touching feature of FIG. 3C.

FIG. 3C is a schematic diagram of the touching object touching the optical touch apparatus of FIG. 1 in the second touch mode. FIG. 3D is a schematic diagram of the second touching feature of FIG. 3C. Referring to FIG. 3C and FIG. 3D, in the present embodiment, the second touching object O2 is adapted to reflect the touch light source TL. Further, because the second touching object O2 is closer to the optical sensing modules 120a and 120b as compared to the light guide member 113, an intensity of a part of the light beam of the touch light source TL transferred through the second touching object O2 to the optical sensing modules 120a and 120b is more protruding than an intensity of the part of the light beam of the touch light source TL reflected by the light guide member 113, and the touching features of the sensing signals SS2 sensed and outputted in the second touch mode include a second touching feature TP2. Furthermore, as shown in FIG. 3D, in the present embodiment, a method of determining the second touching feature TP2 includes: the processing unit 130 determines a protruding portion in response to the touch light source TL being reflected in the sensing signals SS2 received in the second touch mode as the second touching feature TP2.

Figure 3E:
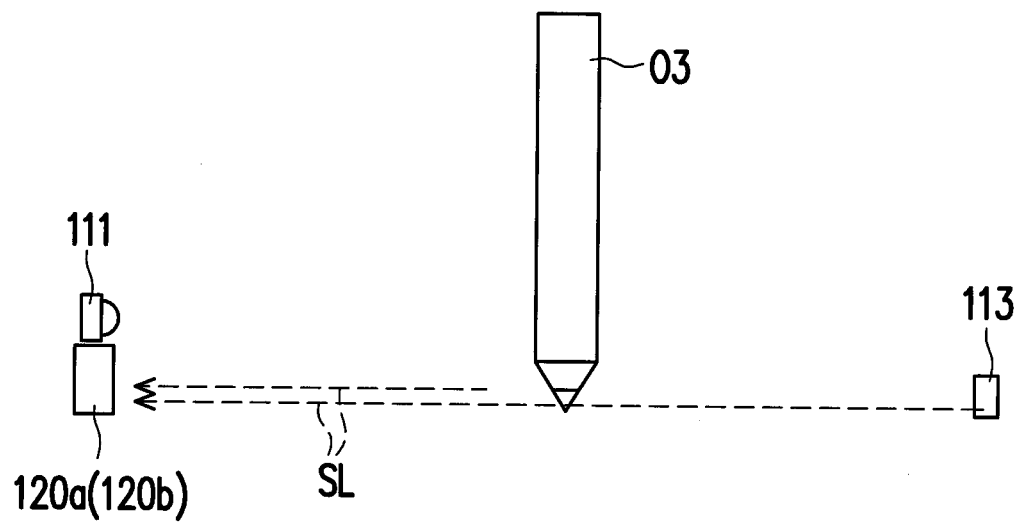
FIG. 3E is a schematic diagram of the touching object touching the optical touch apparatus of FIG. 1 in the third touch mode.
Figure 3F:
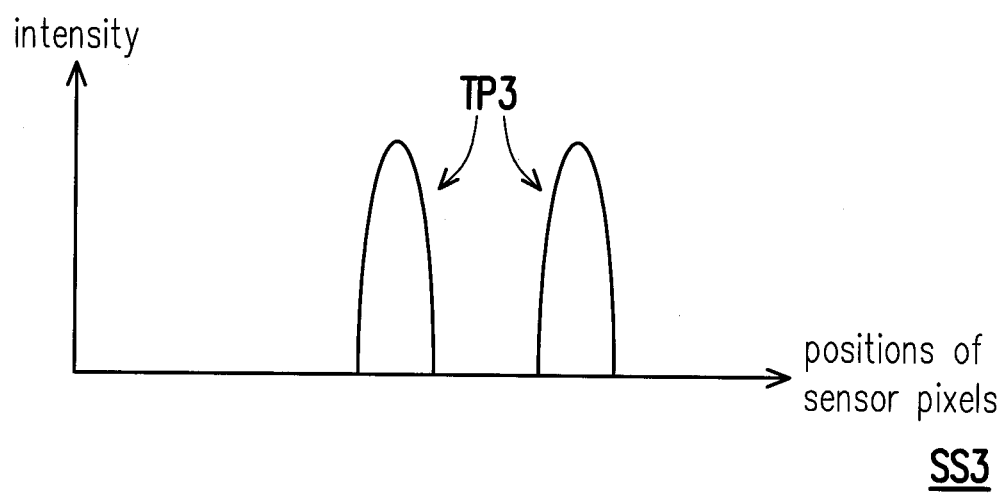
FIG. 3F is a schematic diagram of the third touching feature of FIG. 3E.

FIG. 3E is a schematic diagram of the touching object touching the optical touch apparatus of FIG. 1 in the third touch mode. FIG. 3F is a schematic diagram of the third touching feature of FIG. 3E. In the present embodiment, the third touching object O3 is adapted to generate a sensing light beam SL, and the light source module 110 stops providing the touch light source TL in the third touch mode. In other words, in the present embodiment, the touch light source TL and the sensing light beam SL are emitted at the different time frames, thus the touching feature of the sensing signals SS3 sensed and outputted by the optical sensing modules 120a and 120b in the third touch mode is in response to the sensing light beam SL. Furthermore, as shown in FIG. 3F, in the present embodiment, the touching features include a third touching feature TP3, and a method of determining the third touching feature TP3 includes: the processing unit 130 determines a protruding portion in response to the sensing light beam SL in the sensing signals SS3 received in the third touch mode as the third touching feature TP3.

Figure 3G:
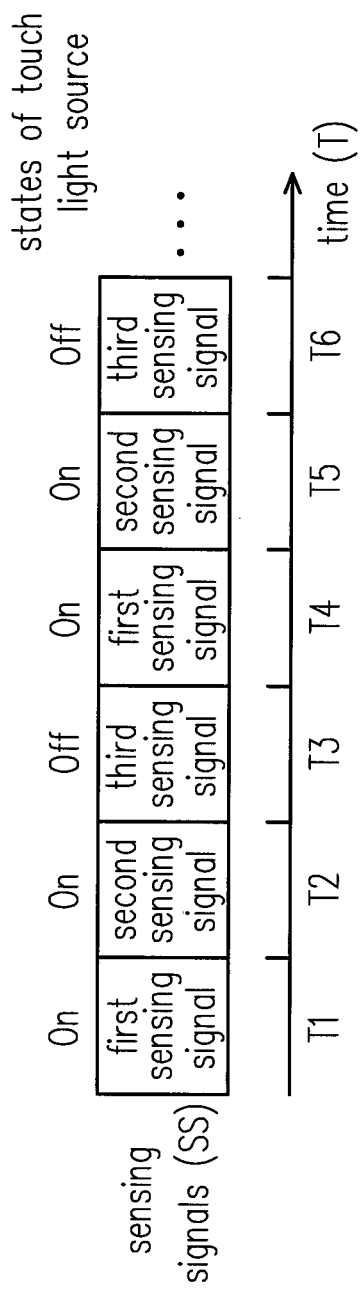
FIG. 3G is a timing mode diagram of the processing unit in receiving different sensing signals with respect to on/off state of the touch light source.
Figure 3H:
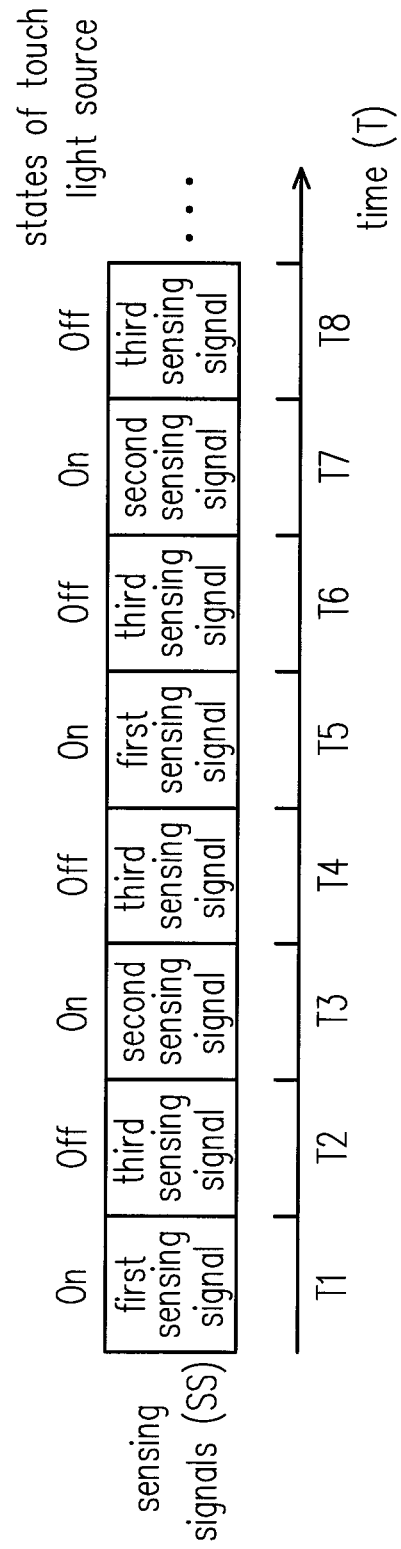
FIG. 3H is another timing mode diagram of the processing unit in receiving different sensing signals with respect to on/off state of the touch light source.

FIG. 3G is a timing mode diagram of the processing unit in receiving different sensing signals with respect to on/off state of the touch light source. FIG. 3H is another timing mode diagram of the processing unit in receiving different sensing signals with respect to on/off state of the touch light source. Furthermore, referring to FIG. 3G and FIG. 3H, in the present embodiment, the processing unit 130 controls on/off state of the touch light source TL, so that the optical touch apparatus 100 may execute different touch modes at the different time frames for sensing the different touching objects O1, O2 and O3. For instance, as shown in FIG. 3G, because the light source module 110 stops providing the touch light source TL in the third touch mode, the processing unit is capable of controlling a touch light source on/off state mode of the touch light source TL, in which: the touch light source TL is turned on at time frames T1 and T4 as well as time frames T2 and T5 for executing the first touch mode at the time frames T1 and T4 and executing the second touch mode at the time frames T2 and T5; and the touch light source TL is turned off at time frames T3 and T6 for executing the third touch mode. In other words, the optical sensing modules 120a and 120b may output the sensing signals SS1, SS2 and SS3 at the time frame T1, the time frame T2 and the time frame T3, respectively, so as to sense the touching objects O1, O2 and O3 at the different time frames. In aforesaid touch light source on/off state mode, time lengths of the touch light source TL in an on-state and an off-state are inconsistent (e.g., the time length of the on-state is longer than the time length of the off-state) but frequencies for executing the different touch modes are consistent. However, the disclosure is not limited thereto.

As shown in FIG. 3H, in another embodiment, the processing unit may control the touch light source TL to turn on at time frames T1 and T5 as well as time frames T3 and T7 for executing the first touch mode at the time frames T1 and T5 and executing the second touch mode at the time frames T3 and T7; and the touch light source TL is turned off at time frames T2, T4, T6 and T8 for executing the third touch mode. In other words, the optical sensing modules 120a and 120b output the sensing signals SS1 at the time frames T1 and T5, output the sensing signals SS2 at the time frames T3 and T7, and output the sensing signals SS3 at the time frames T2, T4, T6 and T8, As a result, the different touching objects O1, O2 and O3 may be sensed at the different time frames. In aforesaid touch light source on/off state mode, time lengths of the touch light source TL in on-state and off-state are consistent, but frequencies for executing the different touch modes are inconsistent. For both cases, the third touch mode is executed after the first touch mode and the second mode. Accordingly, the frequency for executing the third touch mode is a double of the frequency for executing the first touch mode and a double of the frequency for executing the second touch mode.

A method of how the processing unit 130 calculates the positions of the touching objects O on the touch area TA according to the first touching feature TP1, the second touching feature TP2 and the third touching feature TP3 are further described below with reference to FIG. 4A to FIG. 4I.

Figure 4A:
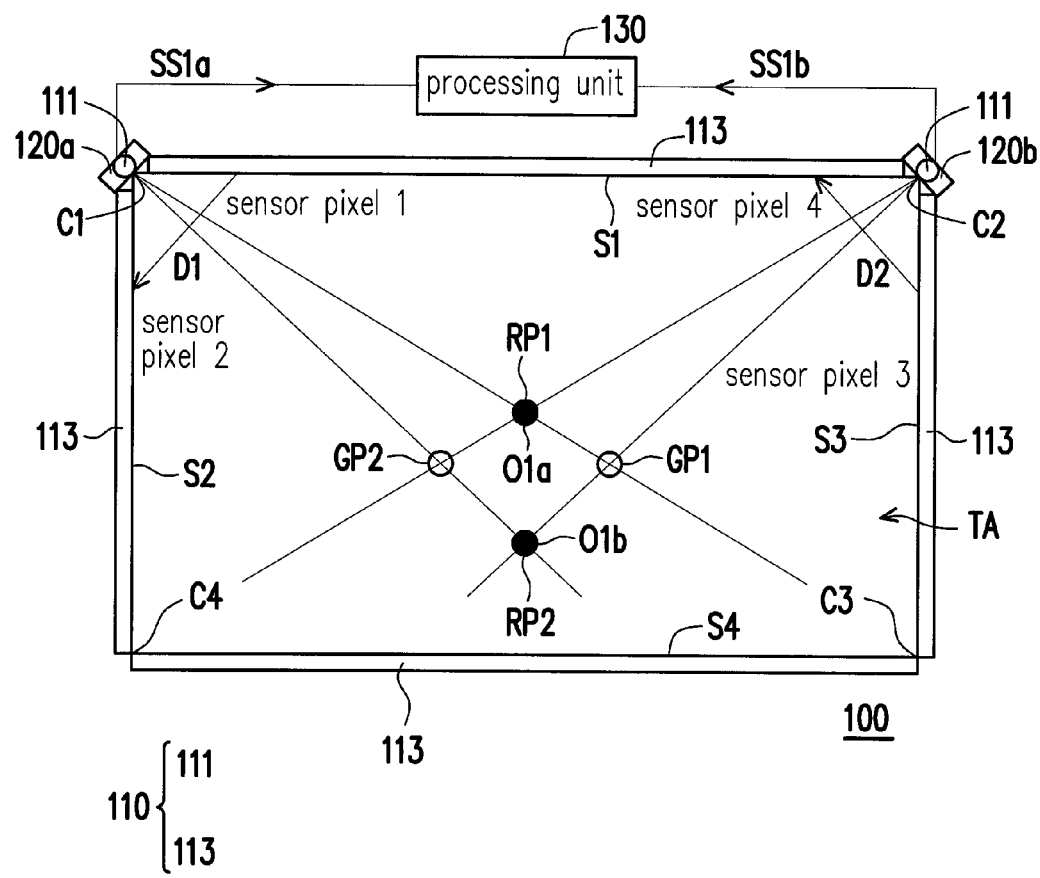
FIG. 4A is a schematic diagram of the two first touching objects touching the optical touch apparatus of FIG. 1.
Figure 4B:
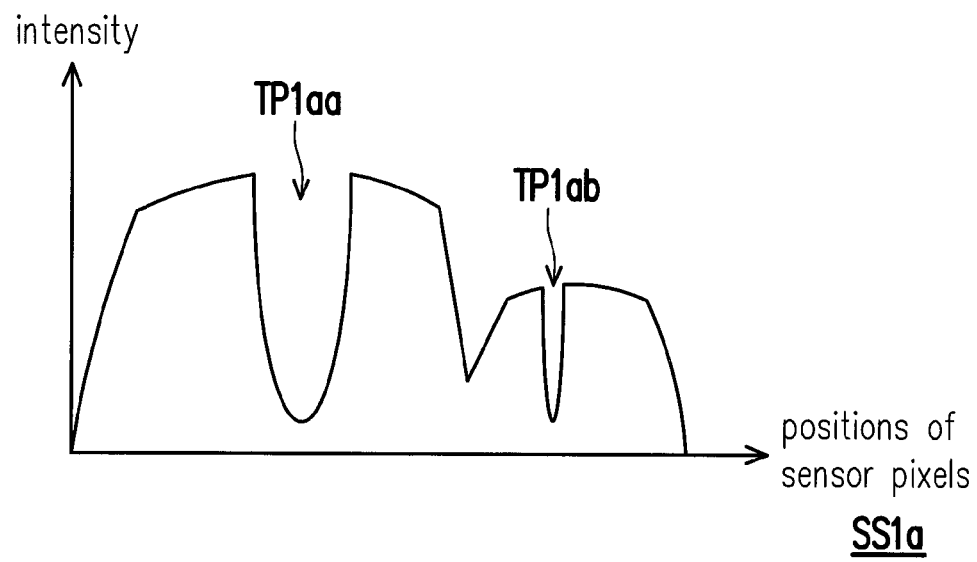
FIG. 4B and FIG. 4C are schematic diagrams respectively illustrating the first touching feature for the two optical sensing modules of FIG. 4A in the first touch mode.
Figure 4C:
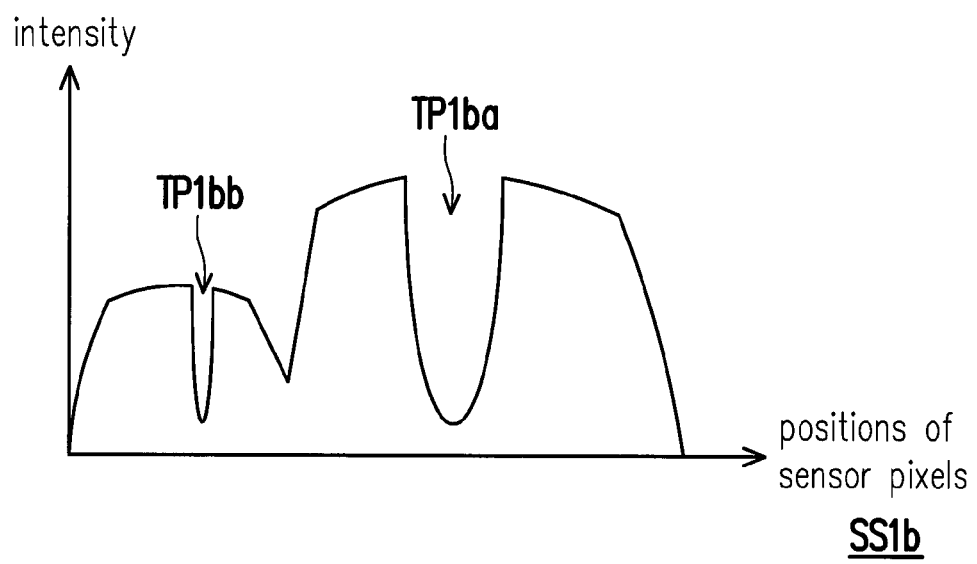

FIG. 4A is a schematic diagram of the two first touching objects O1 touching the optical touch apparatus 100 of FIG. 1. FIG. 4B and FIG. 4C are schematic diagrams respectively illustrating the first touching feature for the two optical sensing modules of FIG. 4A in the first touch mode. Referring to FIG. 4A, for clarity of the description, in the present embodiment, it is assumed that the optical sensing modules 120a and 120b are composed of a row of sensor pixels, such that sensing angles may be obtained by converting positions of the sensor pixels. That is, each of said angles is corresponding to the sensor pixel at one specific position. Further, for clarity of the description, it is also assumed that an arranging direction for numbering the positions of the sensor pixels of the optical sensing modules 120a and 120b in ascending manner is identical to a first direction D1 from a lateral side S1 to a lateral side S2 (i.e., a direction from the sensor pixel 1 to the sensor pixel 2), and an arranging direction for numbering the positions of the sensor pixels of the optical sensing modules 120a and 120b in ascending manner is identical to a second direction D2 from a lateral side S3 to the lateral side S1 (i.e., a direction from the sensor pixel 3 to the sensor pixel 4). According to FIG. 1, the lateral side S1 is opposite to a lateral side S4; the lateral side S2 is opposite to the lateral side S3; the corner C1 formed by the lateral sides S1 and S2 is opposite to a corner C3 formed by the lateral sides S3 and S4; and the corner C2 formed by the lateral sides S1 and S3 is opposite to a corner C4 formed by the lateral sides S2 and S4.

As shown in FIG. 4A, in the present embodiment, as the effect of cross-capturing images by the optical sensing module, 4 intersection points RP1, RP2, GP1 and GP2 are generated, including two touch points RP1 and RP2 (i.e., positions where the first touching objects O1 are located), and two ghost points GP1 and GP2. In the present embodiment, a method of filtering the ghost points GP1 and GP2 includes performing a determination based on a width of the first touching feature TP1 for example.

For instance, when the two first touching objects O1 touch the touch area TA at the same time, the processing unit 130 may identify that the intersection points RP1, RP2, GP1 and GP2 are touch points of the first touching objects O1 according to the width of the first touching feature TP1 (i.e., first touching features TP1$aa$, TP1$ab$, TP1$ba$ and TP1$bb$) sensed by the two optical sensing modules 120$a$ and 120$b$, and output coordinates of the first touching objects O1. More specifically, as shown in FIG. 4B and FIG. 4C, when the two first touching objects O1 touch the touch area TA at the same time, first sensing signals SS1$a$ and SS1$b$ are respectively sensed by the two optical sensing modules 120$a$ and 120$b$. Therein, the first sensing signals SS1$a$ are a sensing result scanned by the optical sensing module 120$a$ from the sensor pixel 1 to the sensor pixel 2, and the first sensing signals SS1$b$ are a sensing result scanned by the optical sensing module 120$b$ from the sensor pixel 3 to the sensor pixel 4. As shown by the first sensing signals SS1$a$, a width of the first touching feature TP1$ab$ of the first touching object O1$b$ farther from the optical sensing module 120$a$ is narrower, whereas a width of the first touching feature TP1$aa$ of the first touching object O1$a$ closer to the optical sensing module 120$a$ is wider. As shown by the first sensing signals SS1$b$, a width of the first touching feature TP1$bb$ of the first touching object O1$b$ farther from the optical sensing module 120$b$ is narrower, whereas a width of the first touching feature TP1$ba$ of the first touching object O1$a$ closer to the optical sensing module 120$b$ is wider. In this case, the processing unit 130 may identify which two of the intersection points RP1, RP2, GP1 and GP2 are the touch points of the first touching objects O1 according to the widths of the first touching features TP1$aa$, TP1$ab$, TP1$ba$ and TP1$bb$, and then calculate and output real coordinates of the first touching objects O1.

Figure 4D:
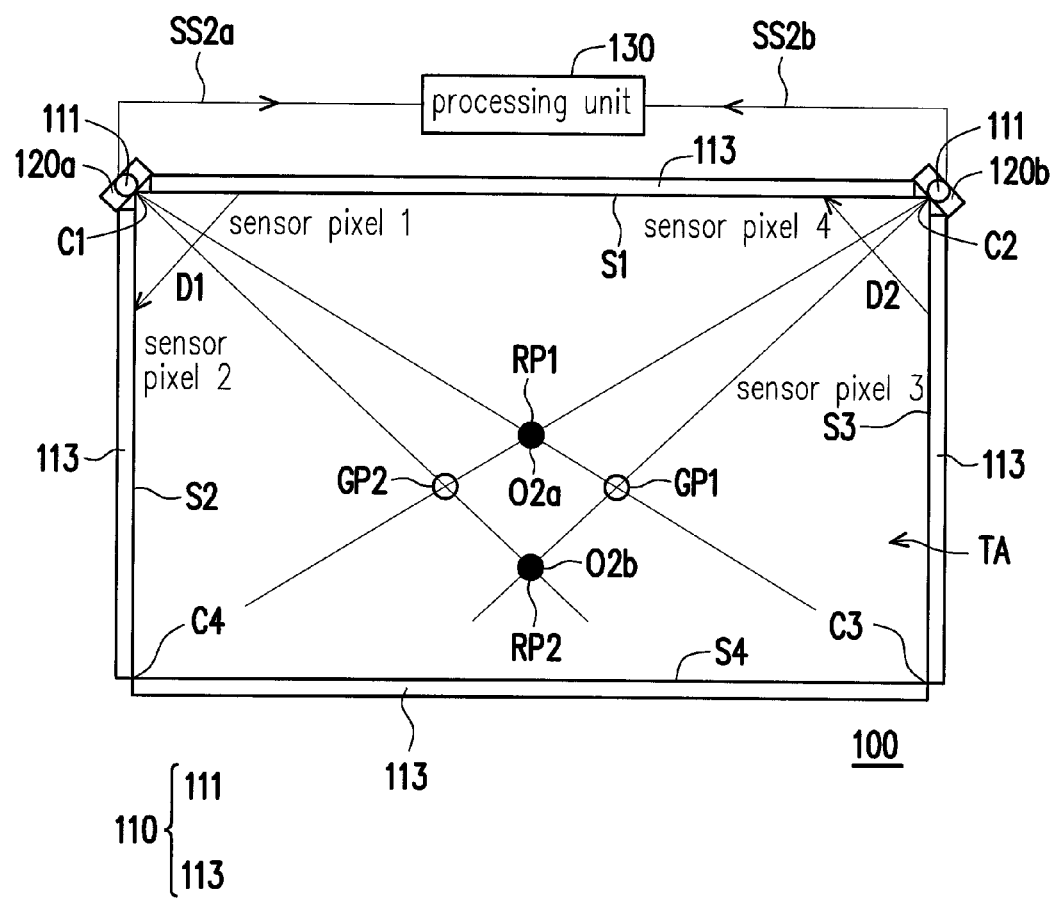
FIG. 4D is a schematic diagram of the two second touching objects touching the optical touch apparatus of FIG. 1.
Figure 4E:
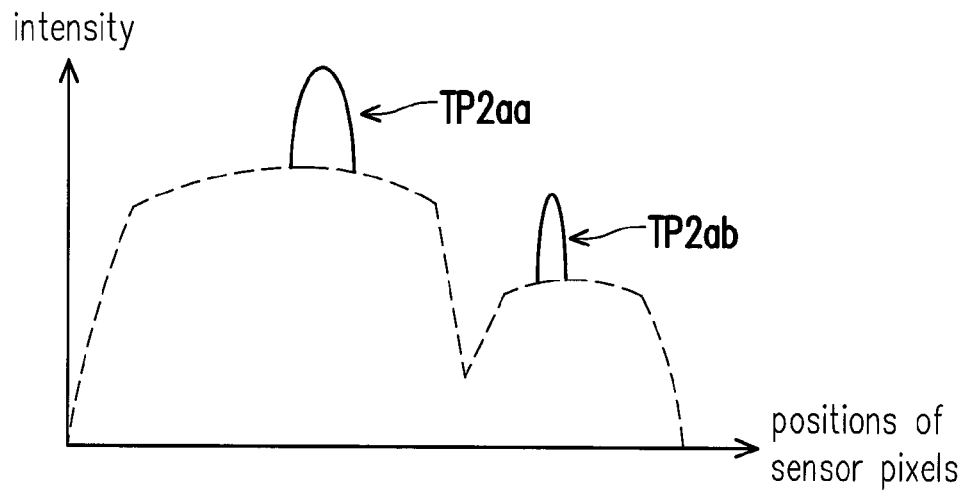
FIG. 4E and FIG. 4F are schematic diagrams respectively illustrating the second touching feature for the two optical sensing modules of FIG. 4D in the second touch mode.
Figure 4F:
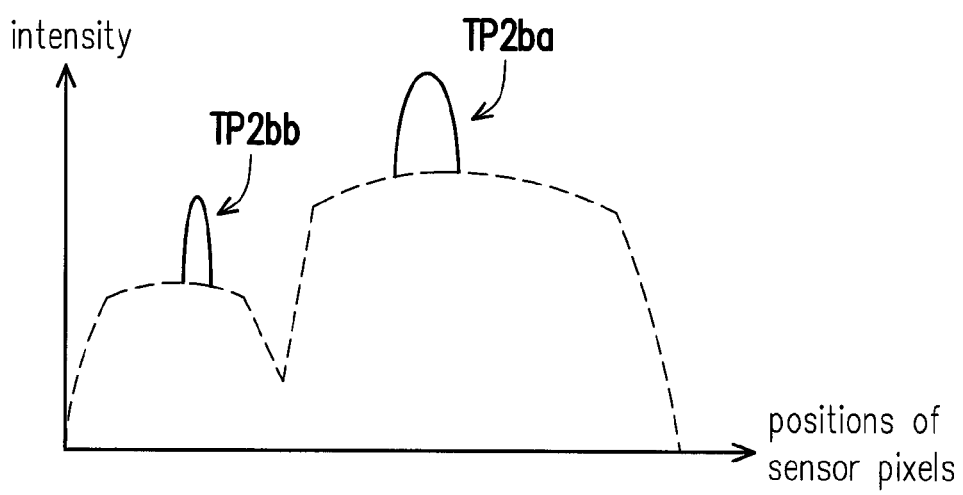

FIG. 4D is a schematic diagram of the two second touching objects touching the optical touch apparatus of FIG. 1. FIG. 4E and FIG. 4F are schematic diagrams respectively illustrating the second touching feature for the two optical sensing modules of FIG. 4D in the second touch mode. Referring to FIG. 4D, a method of numbering positions of sensor pixels of the optical sensing modules 120$a$ and 120$b$ is identical to that depicted in FIG. 4A, which is not repeated hereinafter. As shown in FIG. 4D, in the present embodiment, as the effect of cross-capturing images by the optical sensing module, 4 intersection points RP1, RP2, GP1 and GP2 are also generated, including two touch points RP1 and RP2 (i.e., positions where the second touching objects O2 are located), and two ghost points. In the present embodiment, a method of filtering the ghost points GP1 and GP2 includes performing a determination based on an intensity of the second touching feature TP2 for example.

For instance, when the two second touching objects O2 touch the touch area TA at the same time, the processing unit 130 may identify that the intersection points RP1, RP2, GP1 and GP2 are touch points of the second touching objects O2 according to the intensity of the second touching feature TP2 (i.e., second touching features TP2$aa$, TP2$ab$, TP2$ba$ and TP2$bb$) sensed by the two optical sensing modules 120$a$ and 120$b$, and output coordinates of the second touching objects O2. More specifically, as shown in FIG. 4E and FIG. 4F, when the two second touching objects O2 touch the touch area TA at the same time, second sensing signals SS2$a$ and SS2$b$ are sensed by the two optical sensing modules 120$a$ and 120$b$. Therein, the second sensing signals SS2$a$ are a sensing result scanned by the optical sensing module 120$a$ from the sensor pixel 1 to the sensor pixel 2, and the second sensing signals SS2$b$ are a sensing result scanned by the optical sensing module 120$b$ from the sensor pixel 3 to the sensor pixel 4. As shown by the second sensing signals SS2$a$, an intensity of the second touching feature TP2$ab$ of the second touching object O2$b$ farther from the optical sensing module 120$a$ is lower, whereas an intensity of the second touching feature TP2$aa$ of the second touching object O2$a$ closer to the optical sensing module 120$a$ is higher. As shown by the second sensing signals SS2$b$, an intensity of the second touching feature TP2$bb$ of the second touching object O2$b$ farther from the optical sensing module 120$b$ is lower, whereas an intensity of the second touching feature TP2$ba$ of the second touching object O2$a$ closer to the optical sensing module 120$b$ is higher. In this case, the processing unit 130 may identify which two of the intersection points RP1, RP2, GP1 and GP2 are the touch points of the second touching objects O2 according to the intensities of the first touching features TP2$aa$, TP2$ab$, TP2$ba$ and TP2$bb$, and then calculate and output real coordinates of the second touching object O2.

Figure 4G:
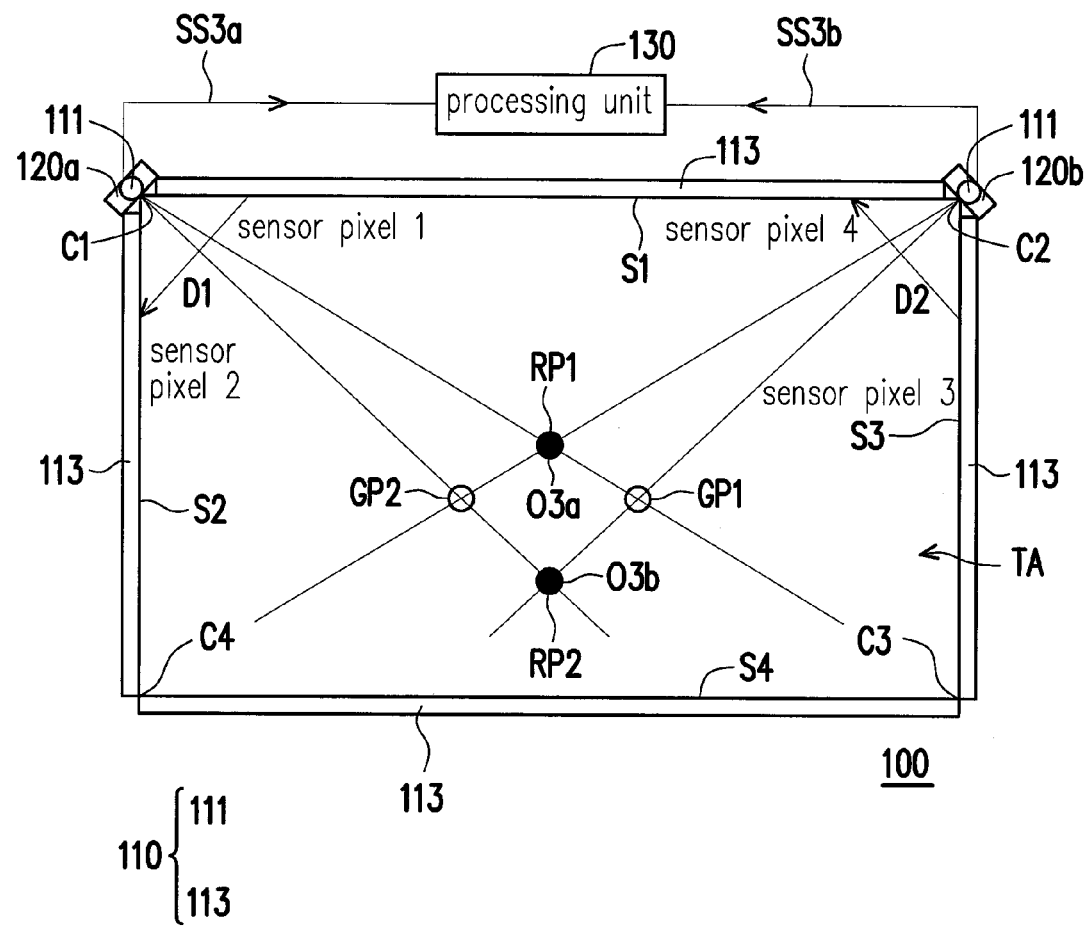
FIG. 4G is a schematic diagram of the two third touching objects touching the optical touch apparatus of FIG. 1.
Figure 4H:
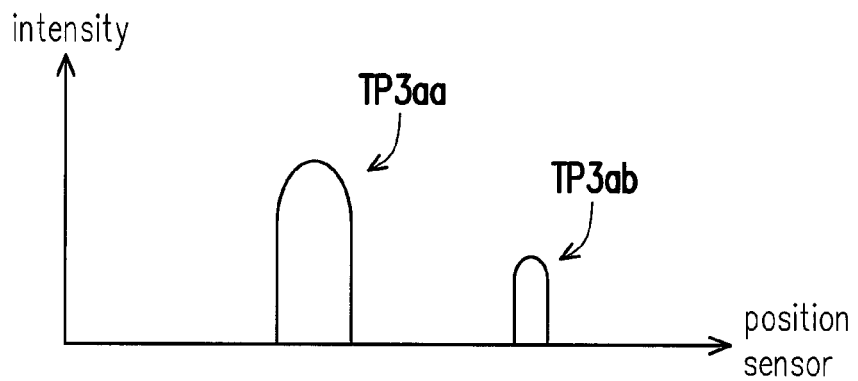
FIG. 4H and FIG. 4I are schematic diagrams respectively illustrating the third touching feature for the two optical sensing modules of FIG. 1 in the third touch mode.
Figure 4I:
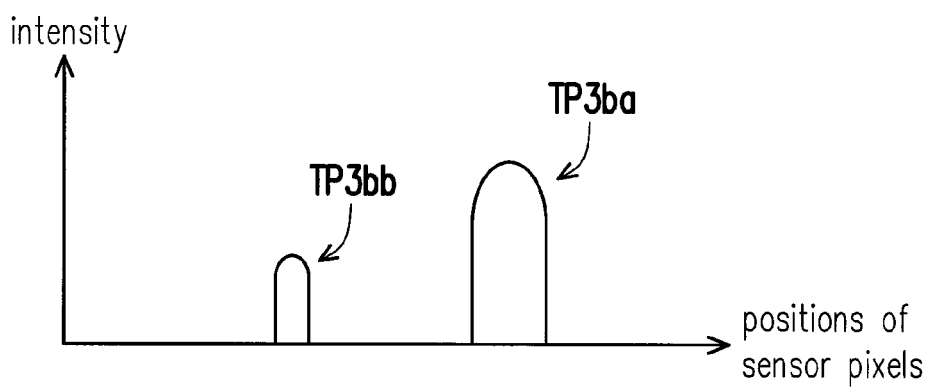

FIG. 4G is a schematic diagram of the two third touching objects touching the optical touch apparatus of FIG. 1. FIG. 4H and FIG. 4I are schematic diagrams respectively illustrating the third touching features for the two optical sensing modules of FIG. 1 in the third touch mode. Referring to FIG. 4G, a method of numbering positions of sensor pixels of the optical sensing modules 120$a$ and 120$b$ is identical to that depicted in FIG. 4A, which is not repeated hereinafter. As shown in FIG. 4G, in the present embodiment, as the effect of cross-capturing images by the optical sensing module, 4 intersection points RP1, RP2, GP1 and GP2 are also generated, including two touch points RP1 and RP2 (i.e., positions where the third touching objects O3 are located), and two ghost points GP1 and GP2. In the present embodiment, a method of filtering the ghost points GP1 and GP2 includes performing a determination based on an intensity of the third touching feature TP3 for example.

For instance, as shown in FIGS. 4H and 4I, when the two third touching objects O3 touch the touch area TA at the same time, the processing unit 130 may identify that the intersection points RP1, RP2, GP1 and GP2 are touch points of the third touching objects O3 according to the intensity of the third touching feature TP3 (i.e., third touching features TP3$aa$, TP3$ab$, TP3$ba$ and TP3$bb$) sensed by the two optical sensing modules 120$a$ and 120$b$, and output coordinates of the third touching objects O3. Herein, methods for the processing unit 130 to identify which two are the real third touching object O3 according to the intensities of the third touching features TP3$aa$ and TP3$ab$ as well as the intensities of the third touching features TP3$aa$ and TP3$ab$ are similar to the method for determining those of the second touching objects O2 as described in FIG. 4E and FIG. 4F, which are not repeated hereinafter.

In other words, in the present embodiment, the method of filtering the ghost points includes performing a determination based on the width of the first touching feature TP1 or the intensities of the second touching feature TP2 and the third touching feature TP3, thereby calculating the real positions of the touching objects O on the touch area TA. The specific implementation of aforesaid methods can refer to Taiwan Patent Publication No. 201344532 (US Patent Publication No. 2013/0278563).

On the other hand, in the present embodiment, the processing unit 130 may also store each of the sensing signals SS of the touching objects O at the different time frames, and estimate the trajectory according to the sensing signals SS to obtain a tendency regarding movements of the touching objects O. Related description to the above are provide below with reference to FIG. 5A to FIG. 7I.

Figure 5A:
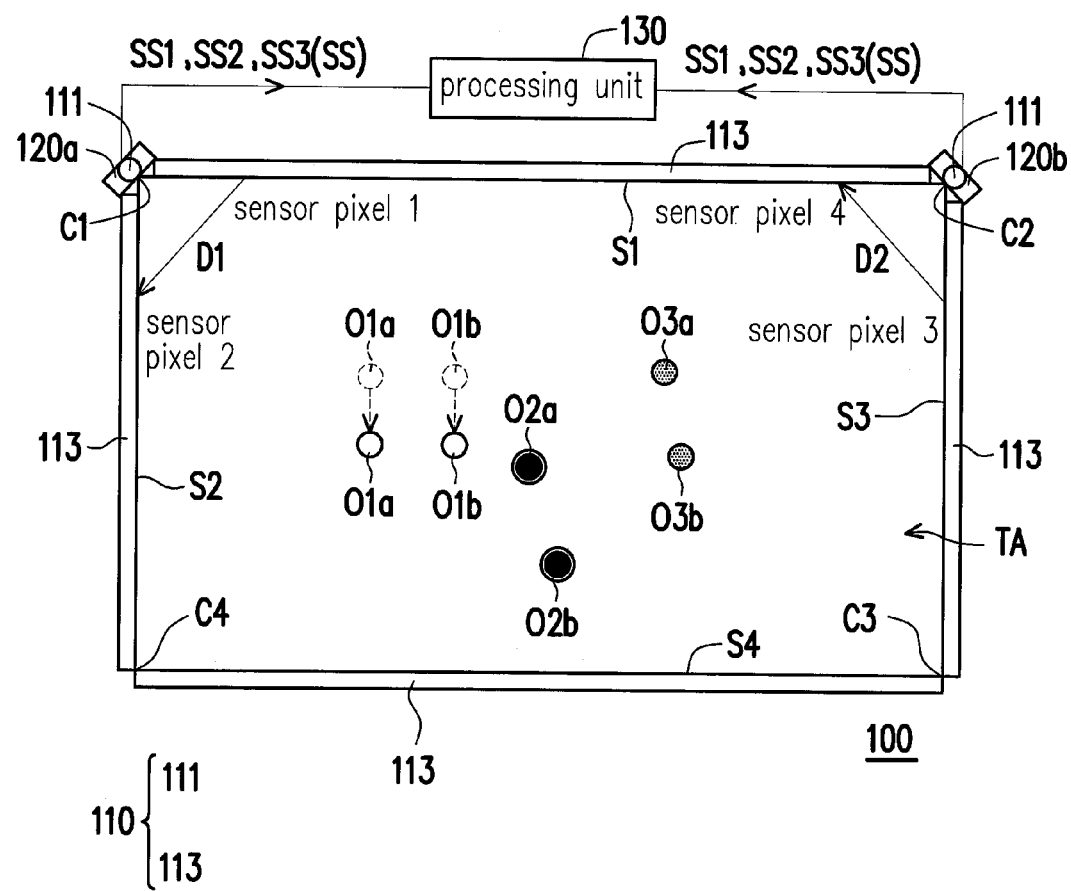
FIG. 5A is a tendency chart of a trajectory of the touching objects on the touch area in the first touch mode.
Figure 5B:
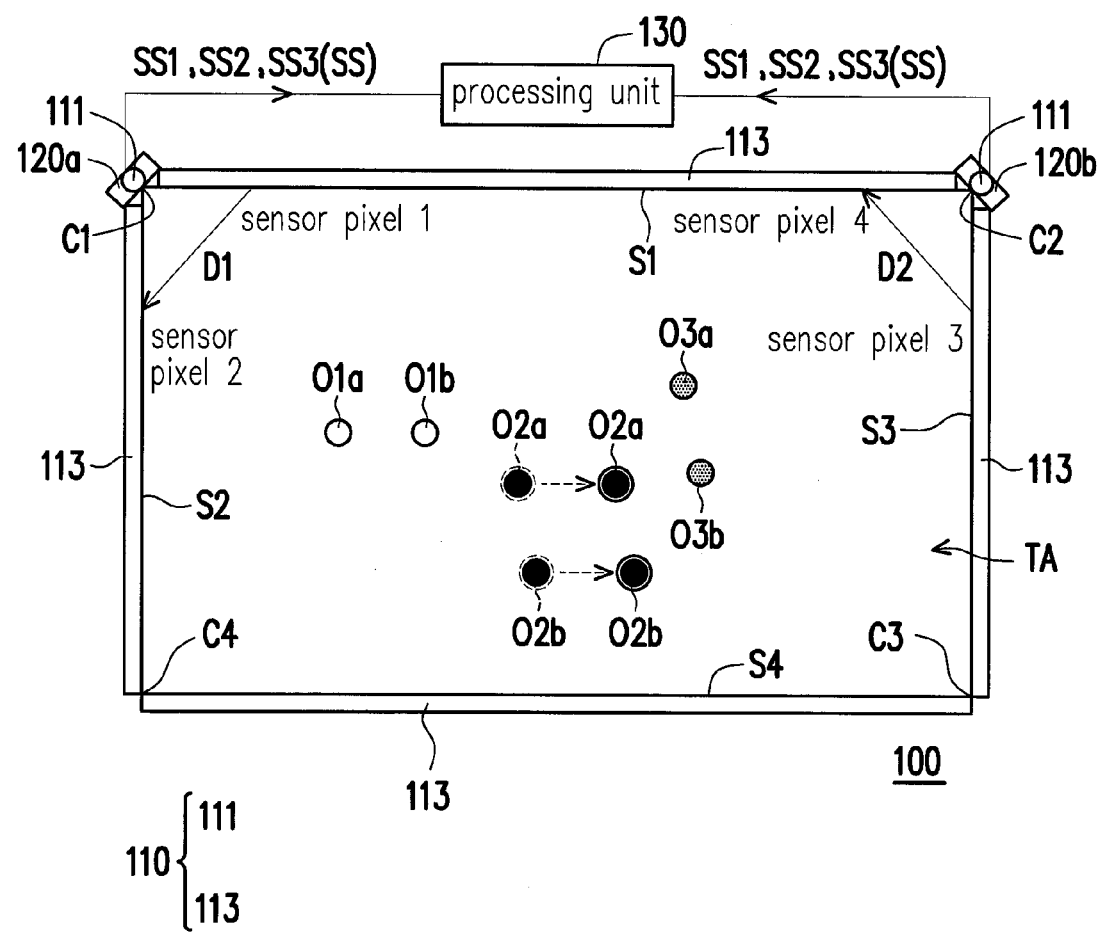
FIG. 5B is a tendency chart of a trajectory of the touching objects on the touch area in the second touch mode.
Figure 5C:
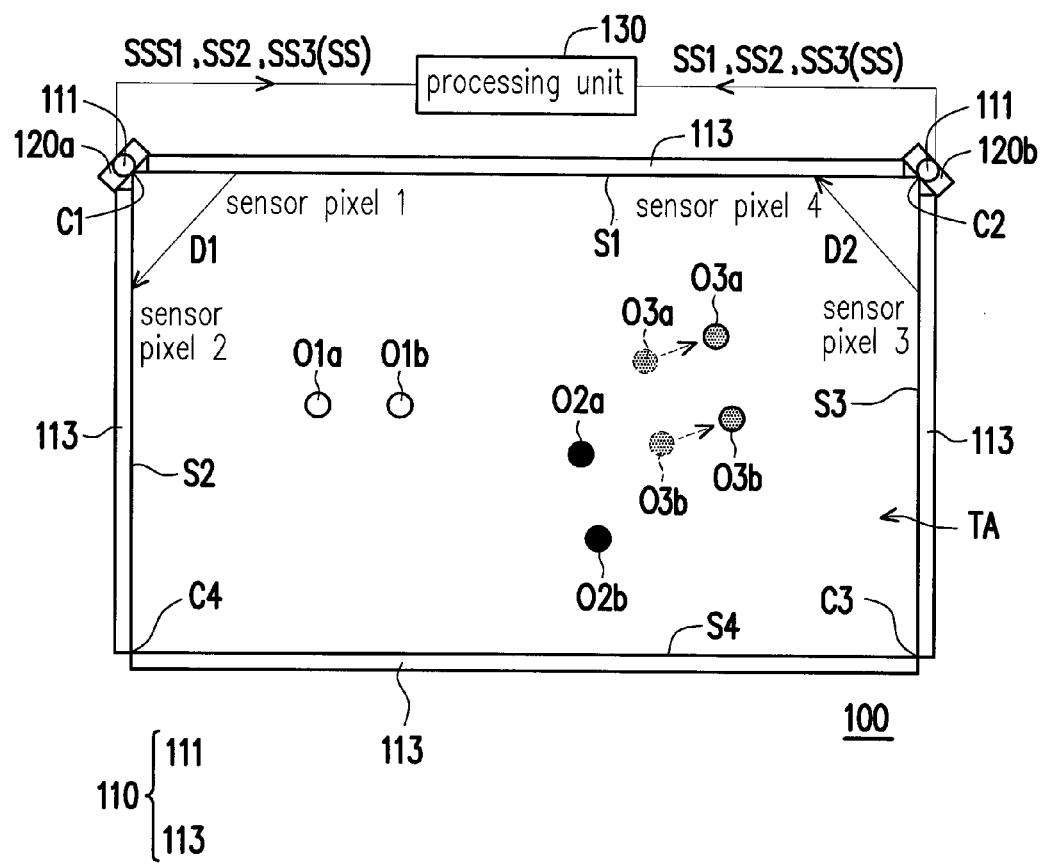
FIG. 5C is a tendency chart of a trajectory of the touching objects on the touch area in the third touch mode.

FIG. 5A is a tendency chart of a trajectory of the touching objects on the touch area in the first touch mode. FIG. 5B is a tendency chart of a trajectory of the touching objects on the touch area in the second touch mode. FIG. 5C is a tendency chart of a trajectory of the touching objects on the touch area in the third touch mode. Referring to FIG. 5A to FIG. 5C, in the present embodiment, the processing unit 130 may also store information regarding positions of the touching objects O at the different time frames. More specifically, in step S130, the processing unit 130 may obtain and store the first sensing signals SS1, the second sensing signals SS2 and the third sensing signals SS3 continuously sensed and outputted by the optical sensing modules 120a and 120b respectively in the first touch mode, the second touch mode and the third touch mode. In other words, the processing unit 130 may obtain the first sensing signals SS1 at different time frames for estimating the trajectory regarding the first touching objects O1, so as to obtain the tendency regarding movements of the first touching objects O1 (as shown in FIG. 5A). Similarly, as shown in FIG. 5B and FIG. 5C, the processing unit 130 may also estimate the trajectory regarding the second touching objects O2 or the third touching objects O3 by obtaining the second sensing signals SS2 or the third sensing signals SS3 at the different time frames, so as to obtain the tendency regarding movements of the second touching objects O2 or the third touching objects O3.

A method of how the processing unit 130 obtains the tendency regarding movements of the touching objects O is further described below with reference to FIG. 6A to FIG. 6F. Moreover, it should be noted that, the following embodiments are illustrated to provide further description by using the method of obtaining the tendency regarding movements of the second touching objects O2 according to the second sensing signals SS2 at the different time frames for example.

FIG. 6A is a schematic diagram illustrating movements of the second touching objects on the touch area. FIG. 6B and FIG. 6C are schematic diagrams respectively illustrating the second sensing signals sensed by the two optical sensing modules of FIG. 6A. Referring to FIG. 6A to FIG. 6C, in the present embodiment, it is assumed that two second touching objects O2a and O2b of the touch area TA are moved from touch points PA and PB to touch points PC and PD. That is, the second touching objects O2a and O2b of the touch area TA are moved towards the lateral side S2, and a distance between the touch points PA and PB is substantially identical to a distance between the touch points PC and PD. In this case, the second touching features TP2 in the second sensing signals SS2a are correspondingly moved from second touching features TP2AA and TP2AB to second touching features TP2AC and TP2AD. That is, a center point between the second touching features TP2 is moved from a center point CA1 between the second touching features TP2AA and TP2AB to a center point CA2 between the second touching features TP2AC and TP2AD. In view of moving directions in the drawing, a moving direction the center point between the second touching features TP2 (i.e., a direction from the center point CA1 to the center point CA2) is identical to the arranging direction for numbering the positions of the sensor pixels of the optical sensing module 120a in ascending manner (i.e., the first direction D1).

On the other hand, the second touching features TP2 in the second sensing signals SS2b are correspondingly moved from second touching features TP2BA and TP2BB to second touching features TP2BC and TP2BD. That is, a center point between the second touching features TP2 is moved from a center point CB1 between the second touching features TP2BA and TP2BB to a center point CB2 between the second touching features TP2BC and TP2BD. In view of moving directions in the drawing, a moving direction the center point between the second touching features TP2 (i.e., a direction from the center point CB1 to the center point CB2) is identical to the arranging direction for numbering the positions of the sensor pixels of the optical sensing module 120b in ascending manner (i.e., the second direction D2).

In addition, in order to prevent errors caused by trembling fingers or touch mechanism from resulting misjudgments in which the center point (CA1, CA2, CB1 or CB2) is determined as in movements, a preset value may be further set. Accordingly, it can be determine that the center point (CA1, CA2, CB1 or CB2) is not moving when an amount of movements of the center is less than or equal to the preset value, and it can be determine that the center point (CA1, CA2, CB1 or CB2) is moving when an amount of movements of the center is greater than the preset value. Therein, a unit of the preset value may be the sensor pixel (e.g, a width of 10 sensor pixels), which can be set according to common knowledges in the field.

Based on above, when the amount of movements of the center point (e.g., CA1, CA2) between the second touching features TP2 (e.g., TP2AA to TP2AD) of the second sensing signals SS2a moving along the first direction D1 is greater than the preset value, and the amount of movements of the center point (e.g., CB1, CB2) between the second touching features TP2 (e.g., TP2BA to TP2BD) of the second sensing signals SS2b moving along the second direction D2 is greater than the preset value, the processing unit 130 may determine that the second touching objects O2a and O2b are moved towards the lateral side S2 (which are moved left in user perspective).

In addition, because the touch points PC and PD are closer to the optical sensing module 120a as compared to the touch points PA and PB, a distance DA2 between the second touching features TP2AC and TP2AD is greater than a distance DA1 between the second touching features TP2AA and TP2AB. That is, the distance between the second touching features TP2 gradually becomes greater over time. Further, because the touch points PC and PD are farther from the optical sensing module 120b as compared to the touch points PA and PB, a distance DB2 between the second touching features TP2BC and TP2BD is less than a distance DB1 between the second touching features TP2BA and TP2BB. That is, the distance between the second touching features TP2 gradually becomes smaller over time.

Based on above, in the present embodiment, when the amount of movements of the center point (e.g., CA1, CA2) between the second touching features TP2 (e.g., TP2AA to TP2AD) of the second sensing signals SS2a moving along the first direction D1 is greater than the preset value, the amount of movements of the center point (e.g., CB1, CB2) between the second touching features TP2 (e.g., TP2BA to TP2BD) of the second sensing signals SS2b moving along the second direction D2 is greater than the preset value, the distance (e.g., DA1, DA2) between the second touching features TP2 (e.g., TP2AA to TP2AD) becomes greater, and the distance (e.g., DB1, DB2) between the second touching features TP2 (e.g., TP2BA to TP2BD) becomes smaller, the processing unit 130 may then determine that the second touching objects O2a and O2b are moved left.

FIG. 6D is a schematic diagram illustrating movements of the second touching objects on the touch area TA. FIG. 6E and FIG. 6F are schematic diagrams respectively illustrating the second sensing signals sensed by the two optical sensing modules of FIG. 6D. Referring to FIG. 6D to FIG. 6F, a difference between the embodiment of FIG. 6D to FIG. 6F and the embodiment of FIG. 6A to FIG. 6C is that, a part of the touch points (e.g., PA, PB, PE and PF) where the second touching objects O2a and O2b are located is different. That is, the tendencies regarding movements of the second objects O2a and O2b are different, which will be described in detail as follows.

For instance, in an embodiment, it is assumed that the second touching objects O2a and O2b of the touch area TA are moved from the touch points PA and PB to touch points PE and PF. That is, the second touching objects O2a and O2b of the touch area TA are moved towards the lateral side S4, and a distance between the touch points PA and PB is substantially identical to a distance between the touch points PE and PF. In this case, the second touching features TP2 in the second sensing signals SS2a are correspondingly moved from the second touching features TP2AA and TP2AB to second touching features TP2AE and TP2AF. That is, a center point between the second touching features TP2 is moved from a center point CA1 between the second touching features TP2AA and TP2AB to a center point CA3 between the second touching features TP2AE and TP2AF. In view of moving directions in the drawing, a moving direction the center point between the second touching features TP2 (i.e., a direction from the center point CA1 to the center point CA3) is identical to the arranging direction for numbering the positions of the sensor pixels of the optical sensing module 120a in ascending manner (i.e., the first direction D1).

On the other hand, the second touching features TP2 in the second sensing signals SS2b are correspondingly moved from the second touching features TP2BA and TP2BB to second touching features TP2BE and TP2BF. That is, a center point between the second touching features TP2 is moved from a center point CB1 between the second touching features TP2BA and TP2BB to a center point CB3 between the second touching features TP2BE and TP2BF. In view of moving directions in the drawing, a moving direction the center point between the second touching features TP2 (i.e., a direction from the center point CB1 to the center point CB3) is opposite to the arranging direction for numbering the positions of the sensor pixels of the optical sensing module 120b in ascending manner (i.e., an opposite direction of the second direction D2).

Based on above, when the amount of movements of the center point (e.g., CA1, CA3) between the second touching features TP2 (e.g., TP2AA, TP2AB, TP2AE and TP2AF) of the second sensing signals SS2a moving along the first direction D1 is greater than the preset value, and the amount of movements of the center point (e.g., CB1, CB3) between the second touching features TP2 (e.g., TP2BA, TP2BB, TP2BE and TP2BF) of the second sensing signals SS2b moving along the opposite direction of the second direction D2 is greater than the preset value, the processing unit 130 may determine that the second touching objects O2a and O2b are moved towards the lateral side S4 (which are moved down in user perspective).

In addition, because the touch points PE and PF are farther from the optical sensing module 120a as compared to the touch points PA and PB, a distance DA3 between the second touching features TP2AE and TP2AF is less than a distance DA1 between the second touching features TP2AA and TP2AB. That is, the distance between the second touching features TP2 gradually becomes smaller over time.

Further, because the touch points PE and PF are farther from the optical sensing module 120b as compared to the touch points PA and PB, a distance DB3 between the second touching features TP2BE and TP2BF is less than a distance DB1 between the second touching features TP2BA and TP2BB. That is, the distance between the second touching features TP2 gradually becomes smaller over time.

Based on above, in the present embodiment, when the amount of movements of the center point (e.g., CA1, CA3) between the second touching features TP2 (e.g., TP2AA, TP2AB, TP2AE and TP2AF) of the second sensing signals SS2a moving along the first direction D1 is greater than the preset value, the amount of movements of the center point (e.g., CB1, CB3) between the second touching features TP2 (e.g., TP2BA, TP2BB, TP2BE and TP2BF) of the second sensing signals SS2b moving along the opposite direction of the second direction D2 is greater than the preset value, the distance (e.g., DA1, DA3) between the second touching features TP2 (e.g., TP2AA, TP2AB, TP2AE and TP2AF) becomes smaller, and the distance (e.g., DB1, DB3) between the second touching features TP2 (e.g., TP2BA, TP2BB, TP2BE and TP2BF) becomes smaller, the processing unit 130 may then determine that the second touching objects O2a and O2b are moved down.

On the other hand, in another embodiment, it is assumed that a plurality of touch points (e.g., two) of the touch area TA are moved from the touch points PE and PF to the touch points PA and PB. That is, the second touching objects O2a and O2b of the touch area TA are moved towards the lateral side S1. In this case, the second touching features TP2 in the second sensing signals SS2a are correspondingly moved from the second touching features TP2AE and TP2AF to the second touching features TP2AA and TP2AB. That is, a center point between the second touching features TP2 is moved from the center point CA3 to the center point CA1. In view of moving directions in the drawing, a moving direction the center point between the second touching features TP2 (i.e., a direction from the center point CA3 to the center point CA1) is opposite to the arranging direction for numbering the positions of the sensor pixels of the optical sensing module 120a in ascending manner (i.e., an opposite direction of the first direction D1).

In addition, the second touching features TP2 in the second sensing signals SS2b are correspondingly moved from the second touching features TP2BE and TP2BF to the second touching features TP2BA and TP2BB. That is, a center point between the second touching features TP2 is moved from the center point CB3 to the center point CB1. In view of moving directions in the drawing, a moving direction the center point between the second touching features TP2 (i.e., a direction from the center point CB3 to the center point CB1) is identical to the arranging direction for numbering the positions of the sensor pixels of the optical sensing module 120b in ascending manner (i.e., the second direction D2).

Based on above, when the amount of movements of the center point (e.g., CA1, CA3) between the second touching features TP2 (e.g., TP2AA, TP2AB, TP2AE and TP2AF) of the second sensing signals SS2a moving along the opposite direction of the first direction D1 is greater than the preset value, and the amount of movements of the center point (e.g., CB1, CB3) between the second touching features TP2 (e.g., TP2BA, TP2BB, TP2BE and TP2BF) of the second sensing signals SS2*b* moving along the second direction D2 is greater than the preset value, the processing unit 130 may determine that the second touching objects O2*a* and O2*b* are moved towards the lateral side S1 (which are moved up in user perspective).

Further, the distance DA1 is greater than the distance DA3, which indicates that the distance between the second touching features TP2 gradually becomes greater over time. Also, the distance DB1 is greater than the distance DB3, which indicates that the distance between the second touching features TP2 gradually becomes greater over time. Based on above, in an embodiment of the disclosure, when the amount of movements of the center point (e.g., CA1, CA3) between the second touching features TP2 (e.g., TP2AA, TP2AB, TP2AE and TP2AF) of the second sensing signals SS2*a* moving along the opposite direction of the first direction D1 is greater than the preset value, the amount of movements of the center point (e.g., CB1, CB3) between the second touching features TP2 (e.g., TP2BA, TP2BB, TP2BE and TP2BF) of the second sensing signals SS2*b* moving along the second direction D2 is greater than the preset value, the distance (e.g., DA1, DA3) between the second touching features TP2 (e.g., TP2AA, TP2AB, TP2AE and TP2AF) becomes greater, and the distance (e.g., DB1, DB3) between the second touching features TP2 (e.g., TP2BA, TP2BB, TP2BE and TP2BF) becomes greater, the processing unit 130 may then determine that the second touching objects O2*a* and O2*b* are moved up.

Figure 6G:
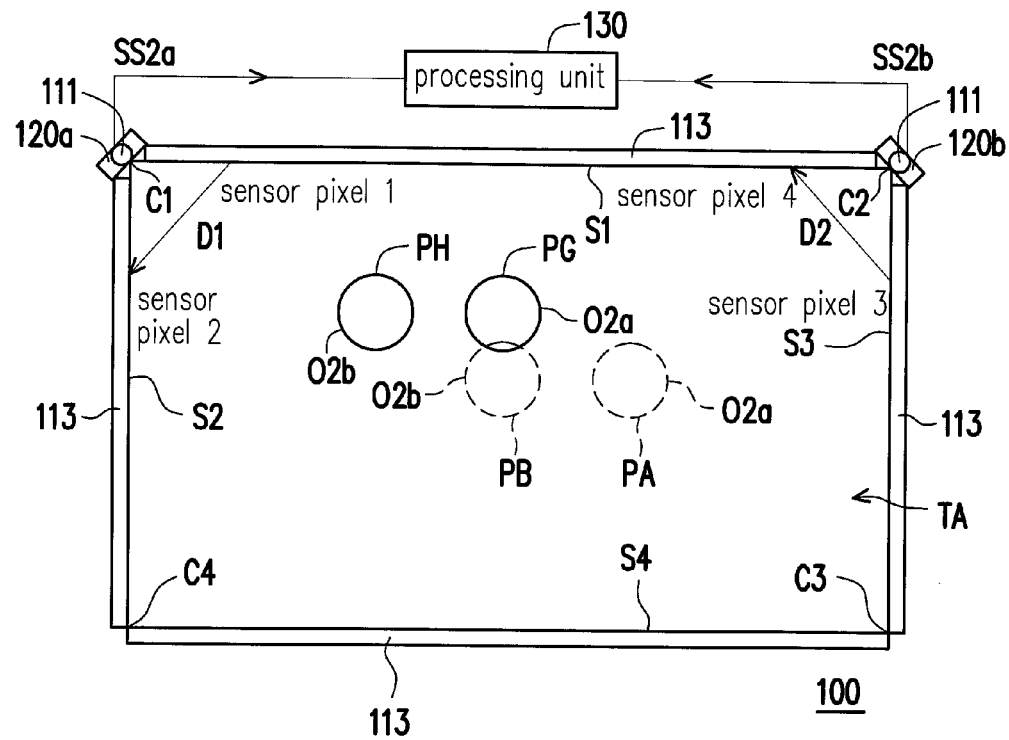
FIG. 6G is a schematic diagram illustrating movements of the second touching objects on the touch area.
Figures 6H, 6I:
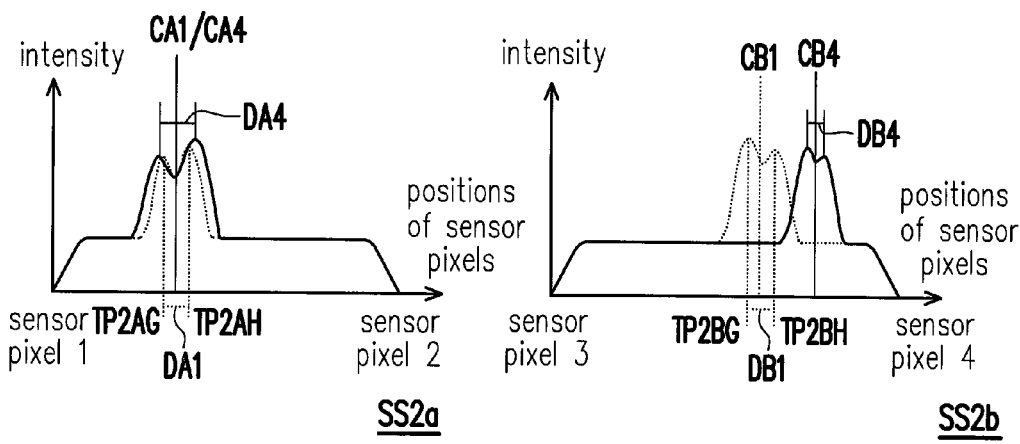
FIG. 6H and FIG. 6I are schematic diagrams respectively illustrating the second sensing signals sensed by the two optical sensing modules of FIG. 6G.

FIG. 6G is a schematic diagram illustrating movements of the second touching objects on the touch area. FIG. 6H and FIG. 6I are schematic diagrams respectively illustrating the second sensing signals sensed by the two optical sensing modules of FIG. 6G. Referring to FIG. 6G to FIG. 6I, a difference between the embodiment of FIG. 6G to FIG. 6I and the embodiment of FIG. 6A to FIG. 6C is that, a part of the touch points where (e.g., PA, PB, PG and PH) the second touching objects O2*a* and O2*b* are located is different. That is, the tendencies regarding movements of the second objects O2*a* and O2*b* are different, which will be described in detail as follows.

For instance, in an embodiment, it is assumed that the second touching objects O2*a* and O2*b* of the touch area TA are moved from the touch points PA and PB to touch points PG and PH. That is, the second touching objects O2*a* and O2*b* of the touch area TA are moved towards the corner C1, and a distance between the touch points PA and PB is substantially identical to a distance between the touch points PG and PH. In this case, the second touching features TP2 in the second sensing signals SS2*a* are correspondingly moved from the second touching features TP2AA and TP2AB to second touching features TP2AG and TP2AH. However, because the center point CA1 between the second touching features TP2AA and TP2AB is overlapped with a center point CA4 between the second touching features TP2AG and TP2AH, which means that the center points between the second touching features TP2 are not moved. That is, the amounts of movements of the center points of the second touching features TP2 are less than or equal to the preset value.

On the other hand, the second touching features TP2 in the second sensing signals SS2*b* are correspondingly moved from second touching features TP2BA and TP2BB to second touching features TP2BG and TP2BH. That is, a center point between the second touching features TP2 is moved from a center point CB1 between the second touching features TP2BA and TP2BB to a center point CB4 between the second touching features TP2BG and TP2BH. In view of moving directions in the drawing, a moving direction the center point between the second touching features TP2 (i.e., a direction from the center point CB1 to the center point CB4) is identical to the arranging direction for numbering the positions of the sensor pixels of the optical sensing module 120*b* in ascending manner (i.e., the second direction D2). Based on above, when the amount of movements of the center point (e.g., CA1, CA4) between the second touching features TP2 (e.g., TP2AA, TP2AB, TP2AG and TP2AH) of the second sensing signals SS2*a* is less than or equal to the preset value, and the amount of movements of the center point (e.g., CB1, CB4) between the second touching features TP2 (e.g., TP2BA, TP2BB, TP2BG and TP2BH) of the second sensing signals SS2*b* moving along the second direction D2 is greater than the preset value, the processing unit 130 may determine that the second touching objects O2*a* and O2*b* are moved towards the corner C1 (which are moved upper-left in user perspective).

In addition, because the touch points PG and PH are closer to the optical sensing module 120*a* as compared to the touch points PA and PB, a distance DA4 between the second touching features TP2AG and TP2AH is greater than a distance DA1 between the second touching features TP2AA and TP2AB. That is, the distance between the second touching features TP2 gradually becomes greater over time. Further, in the present embodiment, because the touch points PG and PH are farther from the optical sensing module 120*b* as compared to the touch points PA and PB, a distance DB4 between the second touching features TP2BG and TP2BH is less than a distance DB1 between the second touching features TP2BA and TP2BB. That is, the distance between the second touching features TP2 may gradually become smaller over time. However, in other embodiments, if angels for sliding the second touching objects O2*a* and O2*b* are different, the touch points PG and PH may be closer to the optical sensing module 120*b* as compared to the touch points PA and PB, or distances of the touch points PG and PH to the optical sensing module 120*b* are substantially identical to distances of the touch points PA and PB to the optical sensing module 120*b*. That is, the distance between the second touching features TP2 may gradually become smaller or remain unchanged over time.

Based on above, in an embodiment of the disclosure, when the amount of movements of the center point (e.g., CA1, CA4) between the second touching features TP2 (e.g., TP2AA, TP2AB, TP2AG and TP2AH) of the second sensing signals SS2*a* is less than or equal to the preset value, the amount of movements of the center point (e.g., CB1, CB4) between the second touching features TP2 (e.g., TP2BA, TP2BB, TP2BG and TP2BH) of the second sensing signals SS2*b* moving along the second direction D2 is greater than the preset value, and the distance (e.g., DA1, DA4) between the second touching features TP2 (e.g., TP2AA, TP2AB, TP2AG and TP2AH) becomes greater, the processing unit 130 may then determine that the second touching objects O2*a* and O2*b* are moved upper-left.

On the other hand, in another embodiment, it is assumed that the second touching objects O2*a* and O2*b* of the touch area TA are moved from the touch points PG and PH to the touch points PA and PB. That is, the second touching objects O2*a* and O2*b* of the touch area TA are moved towards the corner C3. In this case, the second touching features TP2 in the second sensing signals SS2*a* are correspondingly moved from the second touching features TP2AG and TP2AH to the second touching features TP2AA and TP2AB. However, because the center point CA1 between the second touching features TP2AA and TP2AB is overlapped with a center point CA4 between the second touching features TP2AG and TP2AH, which means that the center points between the second touching features TP2 are not moved. That is, the amounts of movements of the center points of the second touching features TP2 are less than or equal to the preset value.

On the other hand, the second touching features TP2 in the second sensing signals SS2b are correspondingly moved from second touching features TP2BG and TP2BH to the second touching features TP2BA and TP2BB. That is, a center point between the second touching features TP2 is moved from the center point CB4 to the center point CB1. In view of moving directions in the drawing, a moving direction the center point between the second touching features TP2 (i.e., a direction from the center point CB4 to the center point CB1) is opposite to the arranging direction for numbering the positions of the sensor pixels of the optical sensing module 120b in ascending manner (i.e., an opposite direction of the second direction D2).

Based on above, when the amount of movements of the center point (e.g., CA1, CA4) between the second touching features TP2 (e.g., TP2AA, TP2AB, TP2AG and TP2AH) of the second sensing signals SS2a is less than or equal to the preset value, and the amount of movements of the center point (e.g., CB1, CB4) between the second touching features TP2 (e.g., TP2BA, TP2BB, TP2BG and TP2BH) of the second sensing signals SS2b moving along the opposite direction of the second direction D2 is greater than the preset value, the processing unit 130 may determine that the second touching objects O2a and O2b are moved towards the corner C3 (which are moved lower-right in user perspective).

In addition, the distance DA1 is less than the distance DA4, which indicates that the distance between the second touching features TP2 gradually becomes smaller over time. Further, in the present embodiment, the distance DB1 is greater than the distance DB4. However, in other embodiments, based on different angles in sliding of gesture, the distance DB1 may be greater than or equal to the distance DB4. Based on above, in an embodiment of the disclosure, when the amount of movements of the center point (e.g., CA1, CA4) between the second touching features TP2 (e.g., TP2AA, TP2AB, TP2AG and TP2AH) of the second sensing signals SS2a is less than or equal to the preset value, the amount of movements of the center point (e.g., CB1, CB4) between the second touching features TP2 (e.g., TP2BA, TP2BB, TP2BG and TP2BH) of the second sensing signals SS2b moving along the opposite direction of the second direction D2 is greater than the preset value, and the distance (e.g., DA1, DA4) between the second touching features TP2 (e.g., TP2AA, TP2AB, TP2AG and TP2AH) becomes smaller, the processing unit 130 may then determine that the second touching objects O2a and O2b are moved lower-right.

It may be deduced from the above embodiments that, when the second touching objects O2a and O2b of the touch area TA are moved towards the corner C2, the moving direction of the center point between the second touching feature TP2 is opposite to the arranging direction for numbering the positions of the sensor pixels of the optical sensing module 120a in ascending manner (i.e., the opposite direction of the first direction D1), while the distance between the second touching features TP2 may gradually become greater, smaller or remain unchanged over time. Also, the amount of movements of the center point between the second touching features TP2 is less than or equal to the preset value, and the distance between the second touching features TP2 gradually becomes greater over time. Therefore, when the amount of movements of the center point between the second touching features TP2 moving along the opposite direction of the first direction D1 is greater than the preset value, and the amount of movements of the center point between the second touching feature TP2 is less than or equal to the preset value, the processing unit 130 determines that the second touching objects O2a and O2b are moved towards the corner C2 (which are moved upper-right in user perspective). Or, when the amount of movements of the center point between the second touching features TP2 moving along the opposite direction of the first direction D1 is greater than the preset value, the amount of movements of the center point between the second touching feature TP2 is less than or equal to the preset value, and the distance between the second touching features TP2 becomes greater, the processing unit 130 determines that the second touching objects O2a and O2b are moved upper-right.

On the other hand, when the second touching objects O2a and O2b are moved towards the conner C4, the moving direction of the center point between the second touching feature TP2 is identical to the arranging direction for numbering the positions of the sensor pixels of the optical sensing module 120a in ascending manner (i.e., the first direction D1), while the distance between the second touching features TP2 may gradually become greater, smaller or remain unchanged over time. Also, the amount of movements of the center point between the second touching features TP2 is less than or equal to the preset value, and the distance between the second touching features TP2 gradually becomes smaller over time. Therefore, when the amount of movements of the center point between the second touching features TP2 moving along the first direction D1 is greater than the preset value, and the amount of movements of the center point between the second touching feature TP2 is less than or equal to the preset value, the processing unit 130 determines that the second touching objects O2a and O2b are moved towards the corner C4 (which are moved lower-left in user perspective). Or, when the amount of movements of the center point between the second touching features TP2 moving along the first direction D1 is greater than the preset value, the amount of movements of the center point between the second touching feature TP2 is less than or equal to the preset value, and the distance between the second touching features TP2 becomes smaller, the processing unit 130 determines that the second touching objects O2a and O2b are moved lower-left.

In view of above, in the present embodiment, the processing unit 130 may obtain the tendency regarding movements of the second touching objects O2a and O2b by estimating the trajectory according to the sensing signals SS. It should be noted that, although the foregoing embodiments are illustrated by using the method of obtaining the tendency regarding movements of the second touching objects O2a and O2b according to the second sensing signals SS2 at the different time frames for example, the disclosure is not limited thereto. The tendency regarding movements of the first touching objects O1 or the third touching objects O3 may also be determined by using similar method to the above. Therefore, further details are not repeated herein. The specific implementation of aforesaid method can refer to Taiwan Patent Publication No. 201349055 (US Patent Publication No. 2013/0314378).

On the other hand, it should be noted that, in the foregoing embodiments, although it is illustrated by using the optical sensing modules 120a and 120b to continuously sense and output the first sensing signals SS1, the second sensing signals SS2 and the third sensing signals SS3 in the first touch mode, the second touch mode and the third touch mode for example, the disclosure is not limited thereto. In the present embodiment, the optical sensing modules 120a and 120b may also continuously sense and output the sensing signals SS based on a condition of whether the touch light source TL is provided. Related description to the above are provide below with reference to FIG. 7A to FIG. 7E.

Figure 7A:
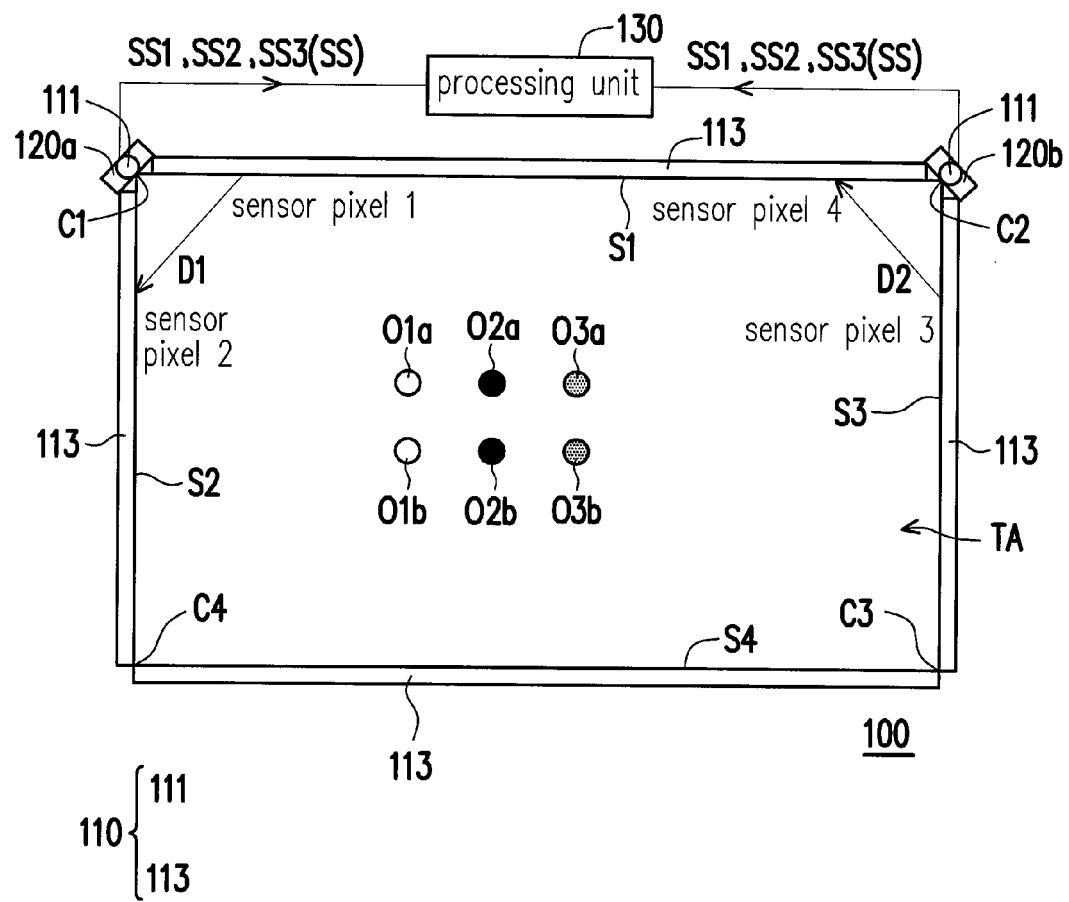
FIG. 7A is a schematic diagram of different touching objects touching the optical touch apparatus of FIG. 1 at the same time.

FIG. 7A is a schematic diagram of different touching objects touching the optical touch apparatus of FIG. 1 at the same time. Referring to FIG. 7A, in the present embodiment, different touching objects O (e.g., the first touching object O1, the second touching object O2 and the touching object O3) may touch the optical touch apparatus 100 of FIG. 1 at the same time. In other words, in the present embodiment, the sensing signals SS respectively continuously sensed and outputted by each of the optical sensing modules 120a and 120b when the touch light source TL is provided and when the touch light source TL is not provided may include the first touching feature TP1, the second touching feature TP2 and the third touching feature TP3 at the same time.

Furthermore, when the touch light source TL is not provided by the optical touch apparatus 100, the sensing signals SS continuously sensed and outputted by the optical sensing modules 120a and 120b is in response to the sensing light beam SL provided by the third touching object O3. Therefore, the touching feature of the sensing signals SS sensed and outputted by the optical sensing modules 120a and 120b at the time is similar to the third touching feature TP3, so that the processing unit 130 may determine a protruding portion in response to the sensing light beam SL in the received sensing signals SS as the third touching feature TP3.

On the other hand, in the present embodiment, when the touch light source TL is provided by the optical touch apparatus 100 and the sensing light beam SL is not provided by the third touching object O3, the processing unit 130 may determine the first touching feature TP1 and the second touching feature TP2 respectively according to the sensing signals SS continuously sensed and outputted by the optical sensing modules 120a and 120b in both the first touch mode and the second touch mode. Related description to the above are provide below with reference to FIG. 7B to FIG. 7E.

Figure 7B:
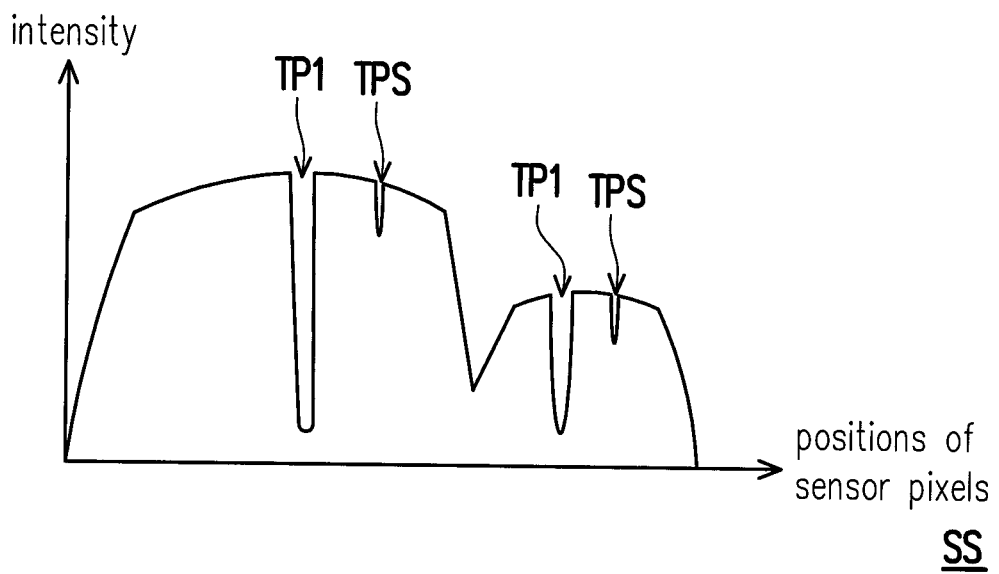
FIG. 7B to FIG. 7D are schematic diagrams of the sensing signals of the optical sensing modules of FIG. 7A when the touch light source is provided.
Figure 7C:
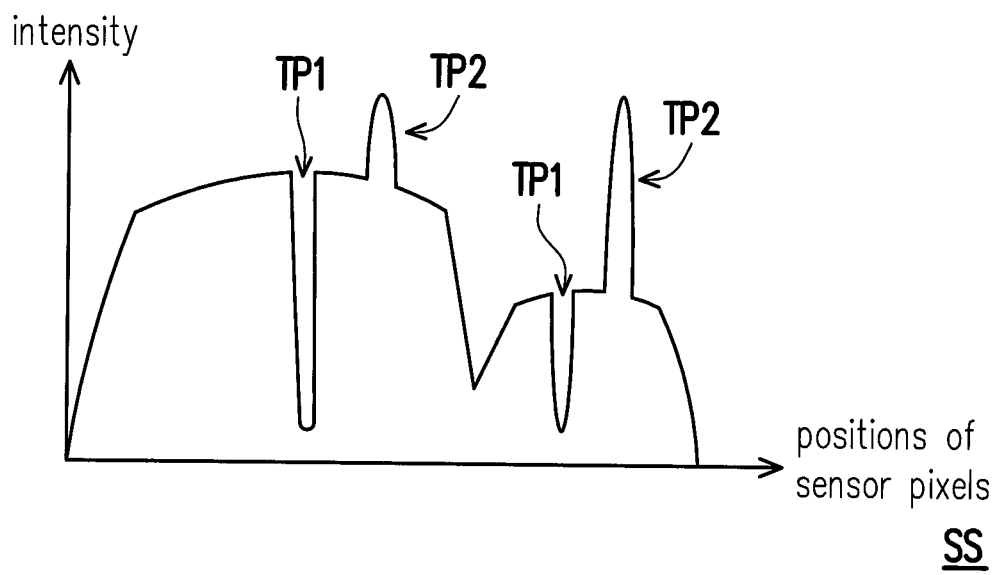

FIG. 7B to FIG. 7E are schematic diagrams of the sensing signals of the optical sensing modules of FIG. 7A when the touch light source is provided. Referring to FIG. 7B and FIG. 7C, when the processing unit 130 is determining the first touching feature TP1 according to the sensing signal SS outputted in the first touch mode, the processing unit 130 may consider a touching feature TPS formed by the third touching object O3 as noise while ignoring the second touching feature TP2 formed by the second touching object O2. More specifically, as shown in FIG. 7B, since a tip of the third touching object O3 is a light-transmissive material, the touch light source TL cannot be easily blocked. Thus, the processing unit 130 may determine the declining portion in response to the touch light source TL being blocked in the received sensing signals SS as the first touching feature TP1 only after it is higher than a preset value. In other hand, as shown in FIG. 7C, in the first touch mode, the processing unit 130 may also only make a determination based only on the declining portion in response to the touch light source TL being blocked in the received sensing signals SS. In other words, in the present embodiment, the protruding portion in response to the touch light source TL being reflected (i.e., the second touch light source TP2) may also be ignored. Accordingly, when the different touching objects O (e.g., the first touching object O1, the second touching object O2 and the touching object O3) touch the optical touch apparatus 100 at the same time, the processing unit 130 may also filter the touching features formed by the second touching object O2 and the third touching object O3, and obtain only the first touching feature TP1 corresponding to the sensing signal SS.

Figure 7D:
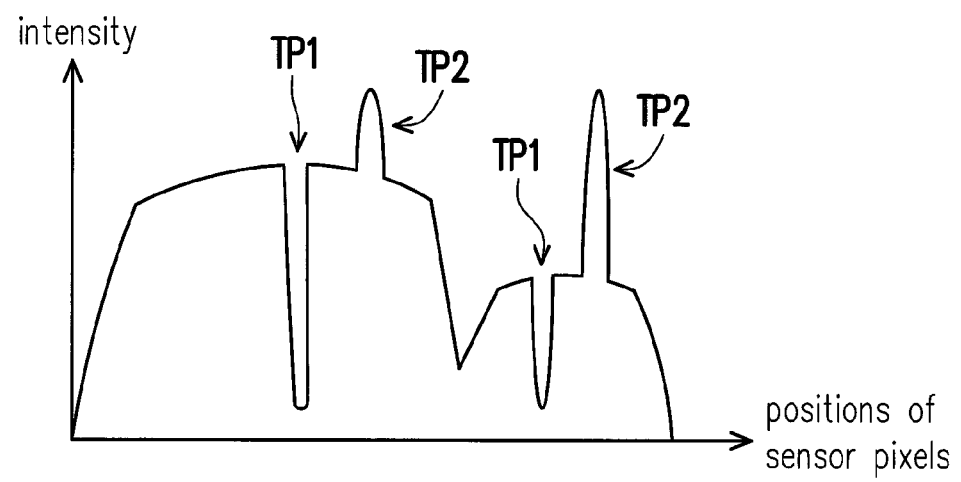

On the other hand, referring to FIG. 7D and FIG. 7E, when the processing unit 130 is determining the second touching feature TP2 according to the sensing signal SS outputted in the second touch mode, a determination may be made to the protruding portion in response to the touch light source TL being reflected in the sensing signals SS (i.e., the second touching feature TP2) while ignoring the declining portion in response to the touch light source TL being blocked. Accordingly, when the different touching objects O (e.g., the first touching object O1, the second touching object O2 and the touching object O3) touch the optical touch apparatus 100 at the same time, the processing unit 130 may also filter the touching features formed by the first touching object O1 and the third touching object O3, and obtain only the second touching feature TP2 corresponding to the sensing signal SS.

FIG. 7E is a timing mode diagram of the processing unit of FIG. 7A in receiving different sensing signals with respect to on/off state of the touch light source. FIG. 7F is another timing mode diagram of the processing unit of FIG. 7A in receiving different sensing signals with respect to on/off state of the touch light source. Referring to FIG. 7E and FIG. 7F, in the present embodiment, the processing unit 130 also controls on/off state of the touch light source TL, so that the optical touch apparatus 100 may execute different touch modes at the different time frames for sensing the different touching objects O1, O2 and O3. For instance, as shown in FIG. 7E, the touch light source TL is turned on at the time frames T1 and T3 to execute the first touch mode and the second touch mode, and the touch light source TL is turned off at the time frames T2 and T4 to execute the third touch mode. More specifically, in the present embodiment, the first touch mode and the second touch mode may be executed at the same time. In other words, the optical sensing modules 120a and 120b may output a composite signal of the sensing signals SS1 and SS2 simultaneously at the time frames T1 and T3, and output the sensing signals SS3 at the time frames T2 and T4. There in, the sensing signals SS1 and SS2 may be analyzed from the composite signal of the sensing signals SS1 and SS2 in a subsequent calculation analysis before determining the touch positions. However, the disclosure is not limited thereto. As shown in FIG. 7F, in another embodiment, the first touch mode and the second touch mode may be executed in sequence at the time frame T1 (or the time frame T2). In other words, the optical sensing modules 120a and 120b may output the sensing signals SS1 and SS2 (in that sequence) respectively at the time frames T1 and T3, and output the sensing signals SS3 at the time frames T2 and T4, so as to sense the touching objects O1, O2 and O3 at the different time frames. It should be noted that, in FIG. 7E and FIG. 7F, time lengths for turning on and turning off the touch light source TL are identical. Therefore, a control for the light source may be simplified. Naturally, the control of the touch light source TL may be adjusted according a time length required by each touch mode in receiving signals, and illustrations of FIGS. 3G, 3H, 7E and 7F are only provided to express sequences in turning on and off, instead of limiting the time length thereof.

In view of above, the processing unit 130 may then calculate the positions of the touching objects O on the touch area TA after determining the first touching feature TP1, the second touching feature TP2 and the third touching feature TP3 corresponding to the sensing signals SS according to the first touch mode, the second ouch mode and the third touch mode. In the present embodiment, a method for the processing unit 130 to calculate the positions of the touching objects O on the touch area TA according to the first touching feature TP1, the second touching feature TP2 and the third touching feature TP3 may be calculated with reference to the method described in FIG. 4A to FIG. 4O. Related execution details may refer to the foregoing paragraphs, which are not repeated hereinafter.

Figure 8A:
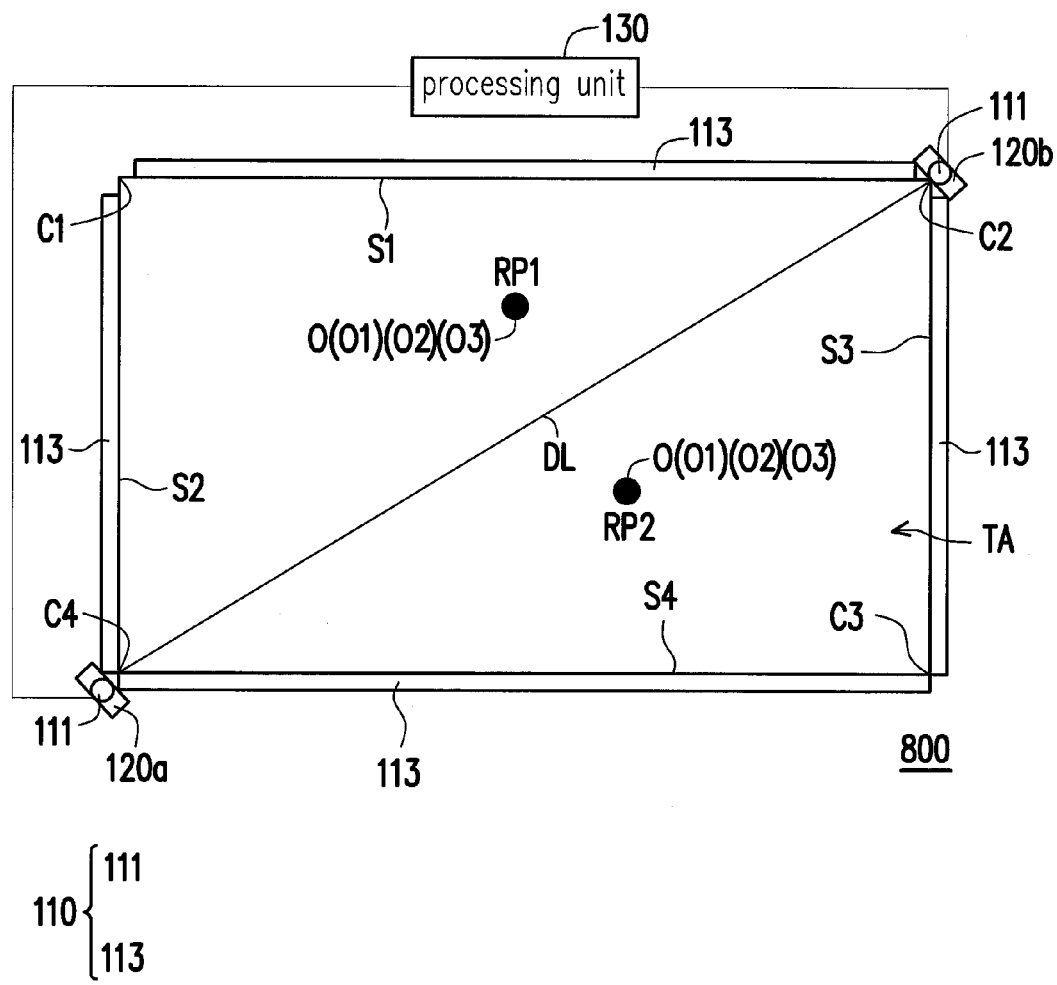
FIG. 8A is a schematic structure diagram of an optical touch apparatus according to an embodiment of the disclosure.
Figure 8B:
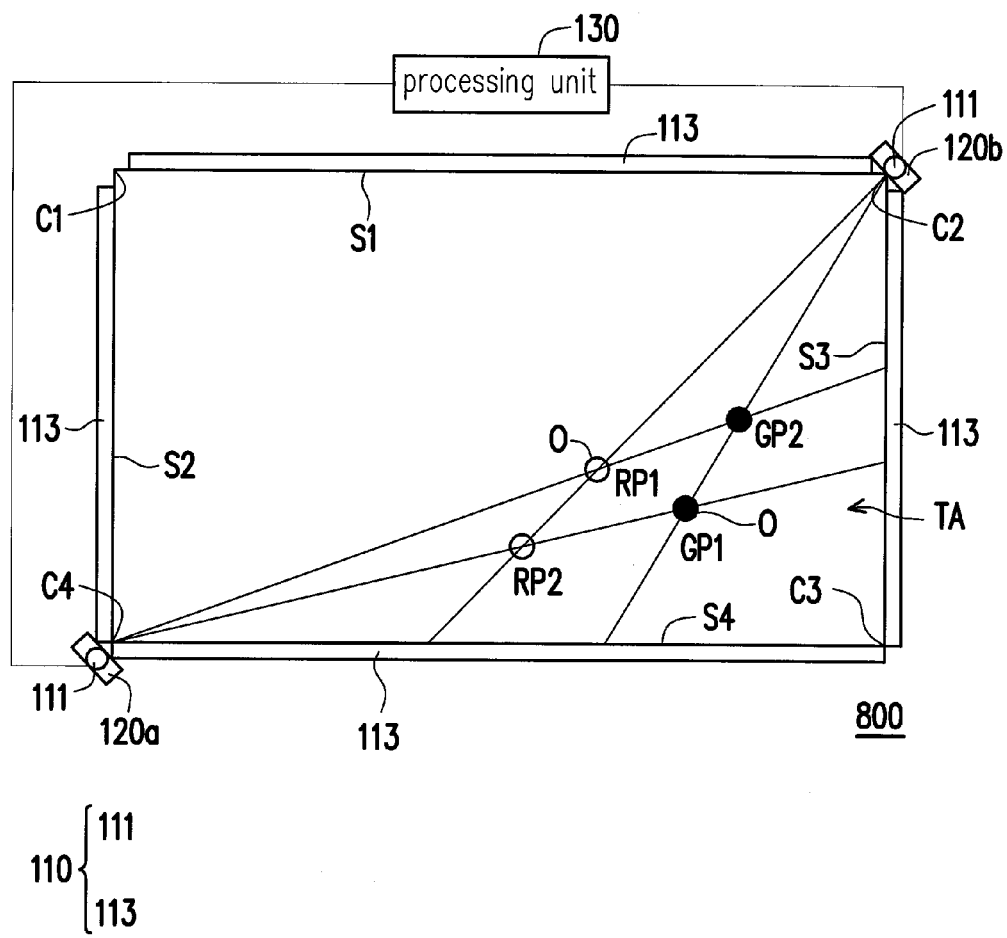
FIG. 8B is a schematic diagram of different touching objects located on the optical touch apparatus of FIG. 8A.

FIG. 8A is a schematic structure diagram of an optical touch apparatus according to an embodiment of the disclosure. FIG. 8B is a schematic diagram of different touching objects located on the optical touch apparatus of FIG. 8A. An optical touch panel 800 of the present embodiment is similar to the optical touch panel 100 of FIG. 5A, and a difference between the two is described below. Referring to FIG. 8A and FIG. 8B, in the present embodiment, the two optical sensing modules 120a and 120b are disposed corresponding to the two corners C2 and C4 in diagonal on the touch area TA, and a link between the two corners C2 and C4 forms a diagonal line DL. The processing unit 130 may determine whether the different touching objects O are located on two sides of the diagonal line DL thereby calculating the positions of the touching objects O. For instance, when the optical sensing modules 120a and 120b continuously sense and output the first sensing signals SS1 in the first touch mode, the processing unit 130 may determine whether two touch points of the first touching objects O1 are respectively located at the two sides of the diagonal line DL according to the first sensing signals SS1 sensed by the optical sensing modules 120a and 120b. For instance, as shown in FIG. 8, two touch points RP1 and RP2 are respectively located at the two sides of the diagonal line DL. By utilizing a diagonal design for the optical sensing modules 120a and 120b, the ghost points are less likely to appear. Accordingly, if the two touch points are respectively located at the two side of the diagonal lien DL, the processing unit 130 may then directly calculate and output coordinates of the two touch points according to the sensing signals SS sensed by the optical sensing modules 120a and 120b based on triangulation.

Similarly, when the optical sensing modules 120a and 120b are in the second touch mode or the third touch mode, the processing unit 130 may also determine whether two touch points of the second touching objects O2 or the third touching objects O3 are respectively located at the two side of the diagonal lien DL according to the second sensing signals SS2 or the third sensing signals SS3 sensed by the optical sensing modules 120a and 120b. Accordingly, if the two touch points are respectively located at the two side of the diagonal lien DL, the processing unit 130 may then directly calculate and output the coordinates of the two touch points according to the sensing signals SS sensed by the optical sensing modules 120a and 120b based on triangulation without determining the ghost points.

On the other hand, when the first touching object O1, the second touching object O2 and the third touching object O3 are located at the same side of the diagonal lien DL, the processing unit 130 may determine the touching features of the sensing signals SS, respectively, so as to calculate positions of the touching objects O on the touch area TA. In the present embodiment, the methods for the processing unit 130 to determine the touching features of the sensing signals SS and to calculate the positions of the touching objects O on the touch area TA according to the touching features may refer to the methods as described in FIG. 3A to FIG. 4I. Related execution details may refer to the foregoing paragraphs, which are not repeated hereinafter.

In summary, in the optical touch apparatus and the optical touch method according to the embodiments of the disclosure, by controlling the light source module to provide the touch light source or not in the different touch modes, and controlling the optical sensing modules to continuously sense and output the sensing signals in the different touch modes, the different touching objects may be sensed at the different time frames. In addition, the optical touch apparatus and the optical touch method are capable of determining the touching features of the sensing signals, respectively, so as to calculate the positions of the touching objects on the touch area. Accordingly, the optical touch apparatus is capable of significantly reducing occurrences of the ghost points for lowering the possibility of misjudgments. As a result, functions of the multi-touch may be realized without increasing the of the optical sensing modules, thereby reducing the product cost and saving the calculation time.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. An optical touch apparatus, comprising:
   a light source module providing a touch light source for a touch area;
   two optical sensing modules disposed corresponding to two corners of the touch area; and
   a processing unit coupled to the light source module and the optical sensing modules, wherein the processing unit controls the light source module to provide the touch light source in a first touch mode and a second touch mode, and controls the light source module to stop providing the touch light source in a third touch mode, each of the optical sensing modules continuously senses and outputs a plurality of sensing signals in the first touch mode, the second touch mode and the third touch mode, and the processing unit determines a plurality of touching features of the sensing signals respectively according to the first touch mode, the second touch mode and the third touch mode to calculate positions of a plurality of touching objects on the touch area,
   wherein the touching features comprise a first touching feature, and the processing unit determines a declining portion in response to the touch light source being blocked in the sensing signals received in the first touch mode as the first touching feature.

2. The optical touch apparatus of claim 1, wherein the first touch mode, the second touch mode and the third touch mode are occurred at different time frames.

3. The optical touch apparatus of claim 1, wherein the touching objects comprise a plurality selected from the group consisting of two first touching objects, two second touching objects and two third touching objects, the first touching objects being adapted to block the touch light source, the second touching objects being adapted to reflect the touch light source, and the third touching objects being adapted to generate a sensing light beam.

4. The optical touch apparatus of claim 3, wherein the touch light source and the sensing light beam are emitted at different time frames.

5. The optical touch apparatus of claim 1, wherein the touching features comprise a second touching feature, and the processing unit determines a protruding portion in response to the touch light source being reflected in the sensing signals received in the second touch mode as the second touching feature.

6. The optical touch apparatus of claim 1, wherein the touching features comprise a third touching feature, and the processing unit determines a protruding portion in response to a sensing light beam of the sensing signals received in the third touch mode as the third touching feature.

7. The optical touch apparatus of claim 1, wherein the sensing signals comprise a first sensing signal, a second sensing signal and a third sensing signal, and each of the optical sensing modules continuously senses and outputs the first sensing signal, the second sensing signal and the third sensing signal respectively in the first touch mode, the second touch mode and the third touch mode.

8. The optical touch apparatus of claim 1, wherein the sensing signals comprise a first sensing signal and a second sensing signal, and each of the optical sensing modules continuously senses and outputs the first sensing signal and the second sensing signal respectively when the touch light source is provided and when the touch light source is not provided.

9. The optical touch apparatus of claim 8, wherein the processing unit determines the first sensing signal according to both the first touch mode and the second touch mode.

10. The optical touch apparatus of claim 1, wherein a quantity of the touching objects is greater than or equal to 1 and less than or equal to 6.

11. The optical touch apparatus of claim 1, wherein the light source module comprises:
    at least a light-emitting element adapted to provide the touch light source; and
    a light guide member adapted to guide the touch light source into the touch area.

12. An optical touch method, comprising:
    controlling a light source module to provide a touch light source for a touch area in a first touch mode and a second touch mode;
    controlling the light source module to stop providing the touch light source in a third touch mode;
    making two optical sensing modules to continuously sense and output a plurality of sensing signals in the first touch mode, the second touch mode and the third touch mode, wherein the optical sensing modules are disposed corresponding to two corners of the touch area; and
    determining a plurality of touching features of the sensing signals respectively according to the first touch mode, the second touch mode and the third touch mode to calculate positions of a plurality of touching objects on the touch area,
    wherein the touching features comprise a first touching feature, and a method of determining the first touching feature comprises:
    determining a declining portion in response to the touch light source being blocked in the sensing signals received in the first touch mode as the first touching feature.

13. The optical touch method of claim 12, wherein the first touch mode, the second touch mode and the third touch mode are occurred at different time frames.

14. The optical touch method of claim 12, wherein the touching objects comprise a plurality selected from the group consisting of two first touching objects, two second touching objects and two third touching objects, the first touching objects being adapted to block the touch light source, the second touching objects being adapted to reflect the touch light source, and the third touching objects being adapted to generate a sensing light beam.

15. The optical touch method of claim 14, wherein the touch light source and the sensing light beam are emitted at different time frames.

16. The optical touch method of claim 12, wherein the touching features comprise a second touching feature, and a method of determining the second touching feature comprises:
    determining a protruding portion in response to the touch light source being reflected in the sensing signals received in the second touch mode as the second touching feature.

17. The optical touch method of claim 12, wherein the touching features comprise a third touching feature, and a method of determining the third touching feature comprises:
    determining a protruding portion in response to a sensing light beam of the sensing signals received in the third touch mode as the third touching feature.

18. The optical touch method of claim 12, wherein the sensing signals comprise a first sensing signal, a second sensing signal and a third sensing signal, and a method of outputting the sensing signals comprises:
    making each of the optical sensing modules to continuously sense and output the first sensing signal, the second sensing signal and the third sensing signal respectively in the first touch mode, the second touch mode and the third touch mode.

19. The optical touch method of claim 12, wherein the sensing signals comprise a first sensing signal and a second sensing signal, and a method of outputting the sensing signals comprises:
    making each of the optical sensing modules to continuously sense and output the first sensing signal and the second sensing signal respectively when the touch light source is provided and when the touch light source is not provided.

20. The optical touch method of claim 19, further comprising:
    determining the first sensing signal according to both the first touch mode and the second touch mode.

21. The optical touch method of claim 12, wherein a quantity of the touching objects is greater than or equal to 1 and less than or equal to 6.

22. The optical touch method of claim 12, wherein the light source module comprises:
    at least a light-emitting element adapted to provide the touch light source; and
    a light guide member adapted to guide the touch light source into the touch area.

* * * * *